US010159918B2

(12) United States Patent
Ardes

(10) Patent No.: US 10,159,918 B2
(45) Date of Patent: Dec. 25, 2018

(54) FILTER HAVING A FILTER BYPASS VALVE, AND FILTER CARTRIDGE THEREFOR

(71) Applicant: HENGST SE & CO. KG, Muenster (DE)

(72) Inventor: Wilhelm Ardes, Ascheberg (DE)

(73) Assignee: HENGST SE & CO. KG, Muenster (DE)

( * ) Notice: Subject to any disclaimer, the term of this patent is extended or adjusted under 35 U.S.C. 154(b) by 0 days.

(21) Appl. No.: 15/557,657

(22) PCT Filed: Mar. 8, 2016

(86) PCT No.: PCT/EP2016/054939
§ 371 (c)(1),
(2) Date: Sep. 12, 2017

(87) PCT Pub. No.: WO2016/142389
PCT Pub. Date: Sep. 15, 2016

(65) Prior Publication Data
US 2018/0065067 A1    Mar. 8, 2018

(30) Foreign Application Priority Data
Mar. 12, 2015    (DE) .......................... 10 2015 103 662

(51) Int. Cl.
*B01D 29/15* (2006.01)
*B01D 35/147* (2006.01)
(Continued)

(52) U.S. Cl.
CPC ............ *B01D 35/147* (2013.01); *B01D 29/15* (2013.01); *B01D 35/153* (2013.01); *B01D 35/30* (2013.01);
(Continued)

(58) Field of Classification Search
None
See application file for complete search history.

(56) References Cited

U.S. PATENT DOCUMENTS 2,995,249 A * 8/1961 Boewe .................. B01D 27/08
210/130
2004/0112429 A1    6/2004 Mack
(Continued)

FOREIGN PATENT DOCUMENTS

DE    29815023    11/1998
DE    19859960    7/2000
(Continued)

OTHER PUBLICATIONS

International Search Report, dated Jun. 8, 2016, priority document.
PCT Search Report, dated Mar. 8, 2016, priority document.

*Primary Examiner* — Chester T Barry
(74) *Attorney, Agent, or Firm* — Greer, Burns & Crain, Ltd.

(57) ABSTRACT

A filter comprising a filter housing, a removable housing cover closing the housing during operation, a liquid inlet, a filtered liquid outlet, an exchangeable filter cartridge separating a raw side of the filter from a clean side, and a filter bypass valve comprising a valve seat and a valve body movably guided relative to the valve seat and biased in a closed direction. The valve seat is fixed in or on the housing cover, the valve body and a spring pre-loading the valve body in the closed direction are guided in or on the housing cover and are fixed to the cover. The filter cartridge has a spring support, such that when the cartridge is installed in the filter and the housing cover is attached to the housing, the end of the spring facing away from the valve body is supported and pre-stressed via the spring support.

27 Claims, 28 Drawing Sheets

(51) Int. Cl.
*B01D 35/153* (2006.01)
*B01D 35/30* (2006.01)
*F01M 1/10* (2006.01)

(52) U.S. Cl.
CPC ......... *F01M 1/10* (2013.01); *B01D 2201/301* (2013.01); *B01D 2201/316* (2013.01); *B01D 2201/40* (2013.01)

(56) References Cited

U.S. PATENT DOCUMENTS

| | | |
|---|---|---|
| 2012/0267293 A1 | 10/2012 | Ardes |
| 2015/0157968 A1 | 6/2015 | Ardes |
| 2016/0220931 A1 | 8/2016 | Ardes |

FOREIGN PATENT DOCUMENTS

| | | |
|---|---|---|
| DE | 29917563 | 2/2001 |
| DE | 202007017980 | 4/2009 |
| DE | 102009054523 | 6/2011 |
| DE | 102012210900 | 1/2014 |
| DE | 202014104029 | 10/2014 |

* cited by examiner

FILTER HAVING A FILTER BYPASS VALVE, AND FILTER CARTRIDGE THEREFOR

CROSS-REFERENCES TO RELATED APPLICATIONS

This application claims the benefit of the German patent application No. 10 2015 103 662.2 filed on Mar. 12, 2015, the entire disclosures of which are incorporated herein by way of reference.

BACKGROUND OF THE INVENTION

The present invention relates to a filter having a filter housing, having a housing cover that seals the filter housing during operation and can be removed from the filter housing, having an inlet for liquid that is to be filtered and having an outlet for filtered liquid, having an exchangeable filter cartridge that separates a raw side and a clean side of the filter from one another, made up of a valve seat and a valve body that is movable relative to the seat and having a valve body preloaded with a force acting in the valve closing direction, the valve seat being situated in or on the housing cover, fixed to the cover, the valve body being guided in or on the housing cover, fixed to the cover, and a spring that preloads the valve body and the valve closing direction being guided in or on the housing cover, fixed to the cover.

In addition, the present invention relates to a filter cartridge for the filter.

A filter of the type named above is known from DE 10 2012 210 900 A1. In the housing cover of the filter, a filter bypass valve is fixedly installed, the parts of the filter bypass valve being situated in a valve housing that is fixedly connected to the cover. The spring of the filter bypass valve is, on the one hand, supported on the valve body of the filter bypass valve and, on the other hand, on the valve housing, so that the spring is always pre-tensioned, and the valve body is always loaded with a pre-loading force acting in the valve closing direction. A change in the pre-loading force of the valve body, in order to change the desired opening pressure of the filter bypass valve, is possible here only through the use of a different spring or through the use of a different valve housing having a modified supporting of the valve spring. Both of these are relatively costly, and require significant constructive interventions in the housing cover, which can be carried out only during the filter production.

DE 20 2014 104 029 U1 discloses a filter that is used as a replacement for a screw-on exchangeable filter that can be replaced only as a whole. The filter has a base plate that, after being screwed onto a connecting flange for the first time, for example of an internal combustion engine, remains there permanently. A filter bypass valve is situated entirely on the base plate. A spring of the filter bypass valve is supported by an exchangeable filter cartridge of the filter and is pre-tensioned when the filter cartridge is installed in the filter.

DE 10 2009 054 523 A1 discloses a filter in which the valve body and the valve spring of the filter bypass valve are parts of a filter housing cover. The valve seat of the filter bypass valve is provided on a cover-side end plate of the filter cartridge. The spring of the filter bypass valve is supported, on the one hand, on the inside on the filter housing cover, and, on the other hand, on the upper side, facing the filter housing cover, of the valve body. The spring of the filter bypass valve here is already pre-tensioned even when no filter cartridge is yet situated in the filter, and acts from above, i.e., from the cover side, on the valve body, pressing it downward, that is away from the filter housing cover, against the valve seat, i.e., in the direction from the filter housing cover toward the filter cartridge.

SUMMARY OF THE INVENTION

For the present invention, an object therefore arises of providing a filter of the type named above that avoids the stated disadvantages of the existing art, and in which a modification of the desired opening pressure of the filter bypass valve is easily possible, even subsequently. Moreover, a filter cartridge for the filter is to be provided that interacts with the filter and for this purpose is matched to the filter.

The solution of the first part of the object, relating to the filter, is achieved according to the present invention with a filter of the type named above that is characterized in that the filter cartridge has a spring support, and that, in the state in which the filter cartridge is installed in the filter, and when the housing cover is attached on the filter housing, the spring is supported and pre-tensioned, at its end oriented away from the valve body, by the spring support.

The present invention advantageously achieves the result that only a small outlay is required in order to modify the opening pressure of the filter bypass valve situated in the housing cover, by easily modifying the filter cartridge with regard to the spring support provided thereon that supports and pre-tensions the spring in the installed state. In this way, when installing the filter cartridge, the spring can be pre-tensioned more or less strongly, which permits a problem-free adjustment of the desired opening pressure of the filter bypass valve, even within a running series production. Costly constructive modifications to the rest of the filter, in particular at the housing cover and the filter bypass valve situated thereon, are not required. Apart from the spring support, the filter cartridge does not need to accommodate or have any further parts of the filter bypass valve, whereby the filter cartridge, as a consumable part, remains technically simple and low in cost.

In order to enable a pre-assembly of the filter bypass valve and to prevent loss of valve parts during filter maintenance when the housing cover is removed from the filter housing, it is further proposed that the filter bypass valve has a valve bearer, and that the valve body and the spring are guided in the valve bearer.

Preferably, the valve seat of the filter bypass valve is fashioned on or in the valve bearer, in order to keep the valve compact and to keep the number of its individual parts low.

The valve bearer is preferably produced as a separate part and connected to the rest of the housing cover. In the production of the filter, a pre-assembled unit of valve bearer, valve body, and spring can then advantageously be formed and can then be connected to the housing cover as a unit.

Here, the valve bearer can be locked, or welded, or glued, or screwed, to the rest of the housing cover.

In order to provide the necessary flow paths given a compact realization of the filter bypass valve, it is proposed that the valve bearer be connected to the housing cover at its outer circumference, leaving free at least one flow opening leading from the raw side to the valve seat, and that the valve seat be fashioned as a perforation in the valve bearer concentric to a longitudinal mid-axis of the housing cover.

Alternatively, the valve bearer can be realized in one piece with the rest of the housing cover.

In a further realization in this regard, it is provided that the valve bearer is provided with at least one flow opening leading from the raw side to the valve seat, and that the valve seat is fashioned as a perforation in the valve bearer concentric to a longitudinal mid-axis of the housing cover.

In order to make it possible to favorably house and guide the spring of the filter bypass valve, the present invention provides that the spring is a helical pressure spring and surrounds the valve body at least over a part of its length.

A development of the filter provides that the filter cartridge can be produced having a different axial length of its spring support or having a different axial position of its spring support, and that, in this way, the pre-tension of the spring and the opening pressure of the filter bypass valve can be modified. For a modification of the pre-tension of the spring and of the opening pressure of the filter bypass valve, only very slight modifications to the filter cartridge are therefore required, which do not result in any significant modification costs.

In order to improve and reliably ensure the support of the spring on the spring support, it is provided that a spring end cap or spring intermediate support, capable of limited axial displacement relative to the valve bearer and covering the end of the spring facing away from the valve body, is guided in or on the valve bearer.

In a further realization in this regard, the filter can be produced having a different axial length of the spring end cap or spring intermediate support, whereby the pre-tension of the spring and the opening pressure of the filter bypass valve can also be modified. In this embodiment, a modification of the opening pressure of the filter bypass valve can thus easily be achieved by installing a modified, shorter or longer spring end cap or spring intermediate support.

In order to enable a further integration of functions, it is proposed that the valve bearer have on its outer circumference a sealing surface for a radial seal situated on the cover side on the filter cartridge.

In order to integrate the spring support in a spatially and functionally advantageous manner in the filter cartridge, it is provided that the spring support present on the filter cartridge is connected or made in one piece with a central support body or with an end plate of the filter cartridge.

Many filters have a drain opening through which the filter is first drained during a maintenance session of the filter that involves removal of the filter cartridge from the filter housing. Here, care must be taken that the drain opening is kept reliably closed during running operation of the filter, and that it is opened when the filter cartridge is removed. In order to meet this requirement with the filter according to the present invention as well, the present invention proposes that the filter housing has, on a housing floor remote from the cover, an eccentric drain opening, and that the filter cartridge has a sealing element on its side facing the housing floor in the installed state, and that in the state in which the filter cartridge is installed in the filter, and when the housing cover is attached on the filter housing, the spring loads the filter cartridge, via the spring support, with a force that holds the sealing element in a sealing seating on the drain opening.

In a standard design, the filter housing has the outlet situated in a central position in its floor next to the eccentric drain opening, this outlet generally being realized in the form of a pipe socket. A development of the filter provides that the filter cartridge has, on its side facing the housing floor in the installed state, a lower end plate having a central opening by which the filter cartridge can be plugged onto the centrally situated outlet, fashioned as a pipe socket, and that the lower end plate is filled on its side pointing toward the housing floor by a sealing material ring, as sealing element, over a region that covers the drain opening in each position in the circumferential direction. In this embodiment, the filter cartridge can seal the drain opening in any rotational position relative to the filter housing, which keeps the installation of the filter cartridge simple.

An alternative embodiment provides that the filter cartridge has, on its side facing the housing floor in the installed state, a lower end plate having a central opening by which the filter cartridge can be plugged onto the centrally situated outlet fashioned as a pipe socket, and that the lower end plate bears on its side oriented toward the housing floor a sealing material plate or sealing material ring as sealing element, whose diameter is matched to the drain opening, and that positioning guide means are situated on the filter cartridge and on the pipe socket-shaped outlet, by which means the filter cartridge, during its installation in the filter, can be compulsorily guided into a rotational position in which the sealing element covers the drain opening. Here, a relatively small sealing element matched to the size of the drain opening is sufficient, which saves sealing material. The positioning guide means ensure the particular positioning required here of the filter cartridge relative to the filter housing.

Concretely, the interacting positioning guide means can be formed by at least one ramp that runs in the manner of a screw threading, followed by an axial groove, on the outer circumference of the pipe socket-shaped outlet on the one hand, and by a radially inward-protruding tab in the central opening in the lower end plate on the other hand, or the interacting positioning guide means can be formed on the filter cartridge by a ramp running in the manner of a screw threading having a step therein on the one hand, and by a radially outward-protruding tab on the outer circumference of the pipe socket-shaped outlet on the other hand.

The part of the object relating to the second filter cartridge interacting with the filter is achieved according to the present invention by a filter cartridge that is characterized in that it has a spring support, and that in the state of the filter cartridge in which it is installed in the filter, the spring of the filter bypass valve can be supported and pre-tensioned at its end facing away from the valve body by the spring support of the filter cartridge. The filter cartridge according to the present invention is matched to the filter described above, and is provided for an interaction with the filter in that in or on the filter cartridge there are situated the spring supports, which provide the necessary pre-tension of the spring of the filter bypass valve of the filter when the filter cartridge is installed in the filter and the housing cover is attached on the filter housing.

The spring support can preferably be formed by a support body that forms a part of the filter cartridge, or can be fashioned on a support body forming part of the filter cartridge.

In an alternative embodiment, the spring support can advantageously be formed by an end plate of the filter cartridge, or can be fashioned on an end plate of the filter cartridge.

In addition, for the filter cartridge, it is preferably provided that it is produced having a different axial length of its spring support or with a different axial position of its spring support, and that in this way, the pre-tension of the spring and the opening pressure of the filter bypass valve can be modified.

In order to ensure a reliable interaction of the spring support with the spring or spring end cap or spring intermediate support, the spring support usefully has a support surface that is shaped and situated corresponding to the shape and situation of the end of the spring, or of the spring end cap, or of the spring intermediate support, that is oriented toward the spring support.

In order to make it possible to open and close a drain opening present in the filter with the filter cartridge as needed, it is provided that the filter cartridge has a sealing element on its side that in the installed state is oriented toward a housing floor of the filter housing, and that, in the state of the filter cartridge in which it is installed in the filter, and when the housing cover is attached on the filter housing, the filter cartridge can be loaded, by the spring of the filter bypass valve via the spring support, with a force that holds the sealing element in a sealing position on the eccentric drain opening situated in the housing floor.

In a further embodiment, it is proposed that the filter cartridge have, on its side facing the housing floor of the filter housing in the installed state, a lower end plate having a central opening by which the filter cartridge can be plugged onto a centrally situated outlet of the filter, fashioned in the shape of a pipe socket, and that the lower end plate be filled, on its side oriented toward the housing floor in the installed state, with a sealing material ring as sealing element over a region that covers the drain opening in every position in the circumferential direction.

In an alternative embodiment thereto, it is provided that the filter cartridge have, on its side facing the housing floor of the filter housing in the installed state, a lower end plate having a central opening by which the filter cartridge can be plugged onto a centrally situated outlet of the filter, fashioned in the shape of a pipe socket, and that the lower end plate bears, on its side oriented toward the housing floor in the installed state, a sealing material plate or a sealing material ring as a sealing element whose diameter is matched to that of the drain opening, and that on the filter cartridge positioning guide means are situated by which, in interaction with further positioning guide means situated on the pipe socket-shaped outlet, the filter cartridge can be compulsorily guided, when the filter cartridge is installed in the filter, into a rotational position in which the sealing element coincides with the drain opening.

Concretely, the positioning guide means on the filter cartridge can be formed by a radially inward-protruding tab in the central opening in the lower end plate, the tab interacting with at least one ramp running in the shape of a screw threading followed by an axial groove on the outer circumference of the pipe socket-shaped outlet in positioning fashion when the filter cartridge is installed in the filter, or the positioning guide means on the filter cartridge can be formed by a ramp running in a screw threading shape having a step therein, the ramp interacting in positioning fashion with a radially outward-protruding tab on the outer circumference of the pipe socket-shaped outlet when the filter cartridge is installed in the filter.

BRIEF DESCRIPTION OF THE DRAWINGS

In the following, exemplary embodiments of the present invention are explained on the basis of a drawing.

DETAILED DESCRIPTION OF THE PREFERRED EMBODIMENTS

Figure 1:
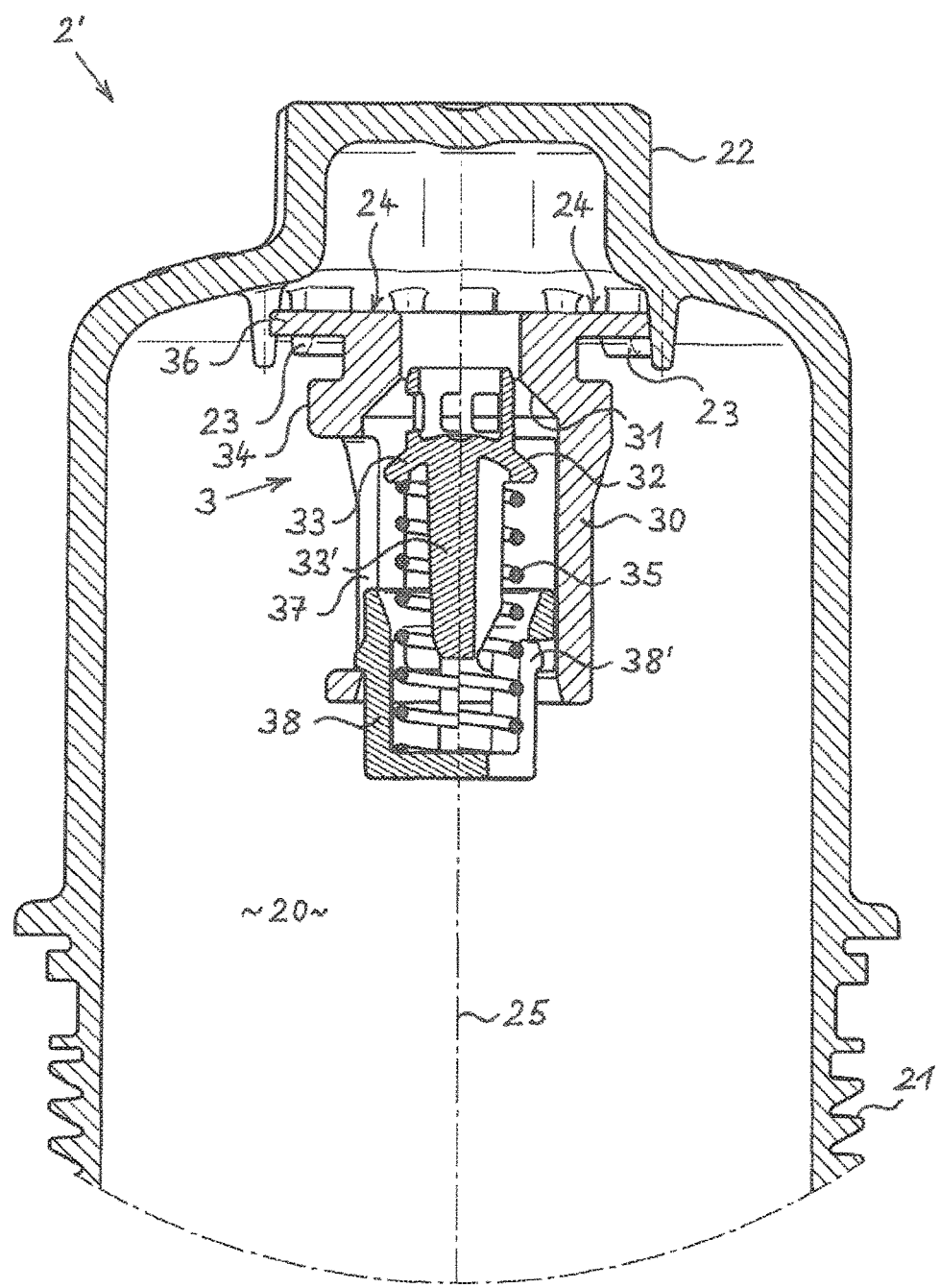
FIG. 1 shows a housing cover of a filter having a filter bypass valve situated therein, in a first embodiment, in longitudinal section.

In the following description of the Figures, identical parts in the various Figures have always been designated with identical reference characters, so that the reference characters do not have to be explained anew for each Figure.

FIG. 1 of the drawing shows a housing cover 2' of a filter having a filter bypass valve 3 situated therein in a first embodiment, in longitudinal section. Housing cover 2' is bell-shaped, having a screw threading 21, realized as an external threading, on its lower edge region, and having a tool attachment 22 situated centrally on its upper side for a screw tool for rotational securing and removal of housing cover 2' onto or off of a filter housing (not shown here). In the interior 20 of housing cover 2', a filter bypass valve 3 is situated fixed to the cover, which, during operation of the associated filter, permits a bypass flow bypassing a filter cartridge of the filter when the flow resistance through the filter cartridge exceeds a specifiable measure.

Filter bypass valve 3 has, as essential components, a valve bearer 30 in whose upper region a valve seat 31 is fashioned, a valve body 32 guided in axially displaceable fashion in valve bearer 30, a spring 35 that pre-loads valve body 32 and surrounds it over a part of its length, and a spring end cap 38 that covers the end of spring 35 oriented away from valve body 32, and that is guided on valve bearer 30 so as to be capable of limited displacement in the axial direction. Valve body 32 is realized having a mushroom shape, with a cap-shaped head 33 and a narrower shaft 33' running under it. Spring end cap 38 is locked with the valve bearer 30 with locking arms 38' integrally formed thereon, and locking arms 38' at the same time form the limitation of the displacement path of spring end cap 38 relative to valve bearer 30.

Radially externally, valve bearer 30 has in its upper region a cylindrical sealing surface 34 that provides sealing interaction with a filter cartridge, which here is not yet installed.

The upper end face of valve bearer 30 is formed by a circumferential holding collar 36 that is connected, here in locking fashion, to housing cover 2' by holding elements 23 on the inside of the cover. Flow openings 24 (not visible in the section according to FIG. 1) run through holding collar 36, which openings connect a raw side of the filter to an inflow side of filter bypass valve 3 when the filter cartridge is installed.

In the state of filter bypass valve 3 shown in FIG. 1, its spring 35 with spring end cap 38 is not loaded and is not pre-tensioned, because a filter cartridge is not present, and as a result valve body 33 here assumes its opening position relative to valve seat 31.

Figure 2:
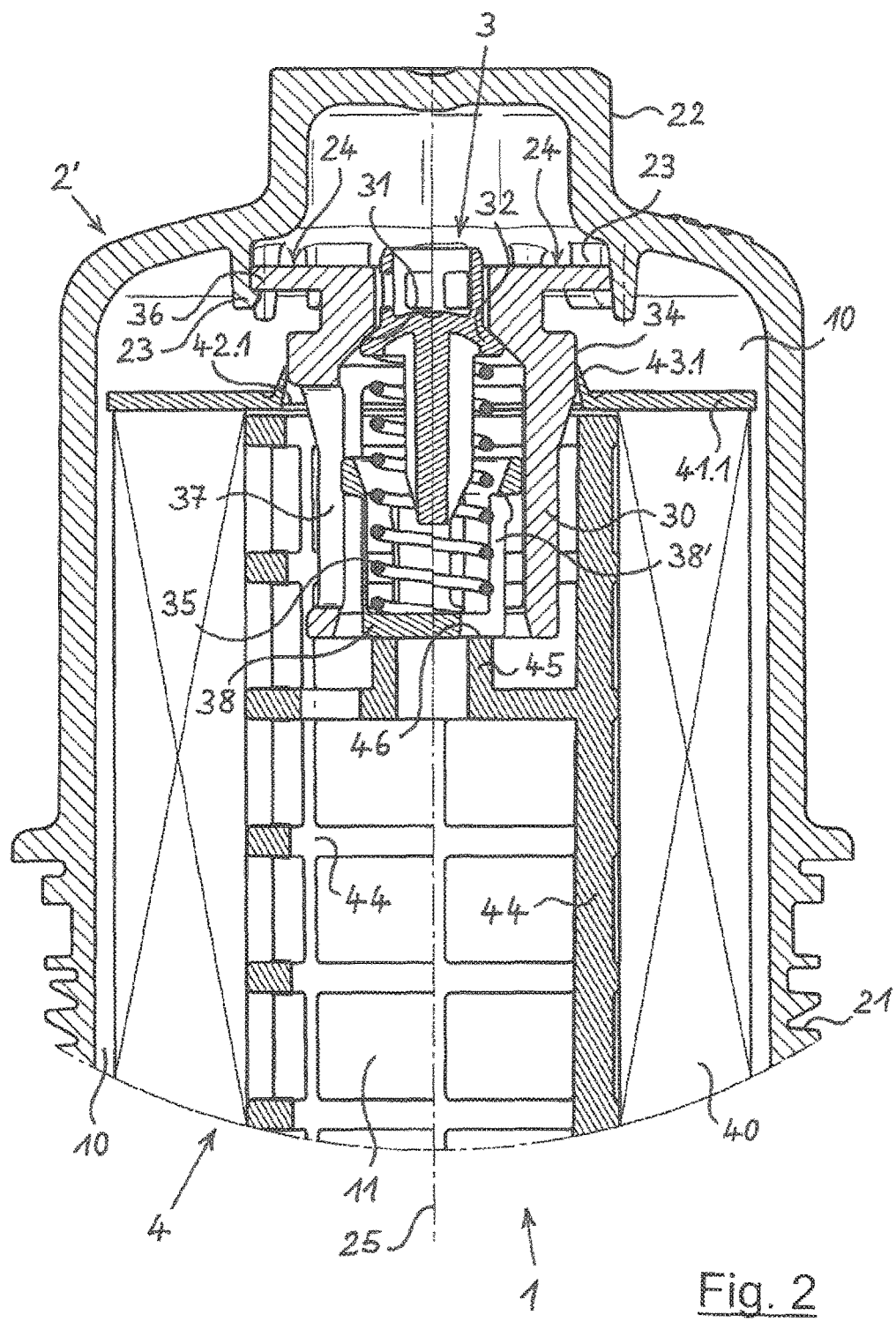
FIG. 2 shows the housing cover of FIG. 1 together with an installed filter cartridge, in longitudinal section.

FIG. 2 shows housing cover 2' of FIG. 1, together with an installed filter cartridge 4 in longitudinal section; here a filter housing to which housing cover 2' is screwed is not shown for reasons of clarity. Filter cartridge 4 has a hollow cylindrical filter material body 40 encompassed at its upper side by an upper end plate 41.1. The lower end face (not visible here) of filter material body 40 is covered by a further end plate. In the interior of filter material body 40, there is situated a grid-shaped supporting body 44 on which filter material body 40 can be supported, with its radially inner circumferential side, when a liquid that is to be filtered is flowing through, in order to prevent clogging of filter material body 40.

Outside filter cartridge 4 there is situated a raw side 10 of filter 1, to which a liquid to be cleaned, alternatively a gaseous medium to be cleaned, flows during filter operation via an inlet not visible here. Radially inward from filter material body 40 there is situated a clean side 11 of filter 1, from where the filtered liquid flows out, through an outlet also not visible here.

Upper end plate 41.1 of filter cartridge 4 has a central opening 42.1 that is surrounded by a radial seal 43.1. With opening 42.1 and seal 43.1, filter cartridge 4 is plugged onto cylindrical sealing surface 34 externally on valve bearer 30 of filter bypass valve 3 fixed to the cover.

Support body 44 situated in the interior of filter cartridge 4 is made in one piece with a spring support 45 that has a support surface 46 that is oriented upward. In the assembled state shown in FIG. 2, spring support 45 is situated with its support surface 46 seated on the underside of spring end cap 38, and, via this cap, pre-tensions spring 35 of filter bypass valve 3 with a specifiable force, thereby determining a desired opening pressure of filter bypass valve 3.

If a different opening pressure of filter bypass valve 3 is desired, this can easily be brought about through a modification of the axial length and/or axial position of spring support 45, because this causes a corresponding increase or reduction of the pre-tension of spring 35. Further modifications at filter 1 do not have to be carried out for this purpose.

Figure 3:
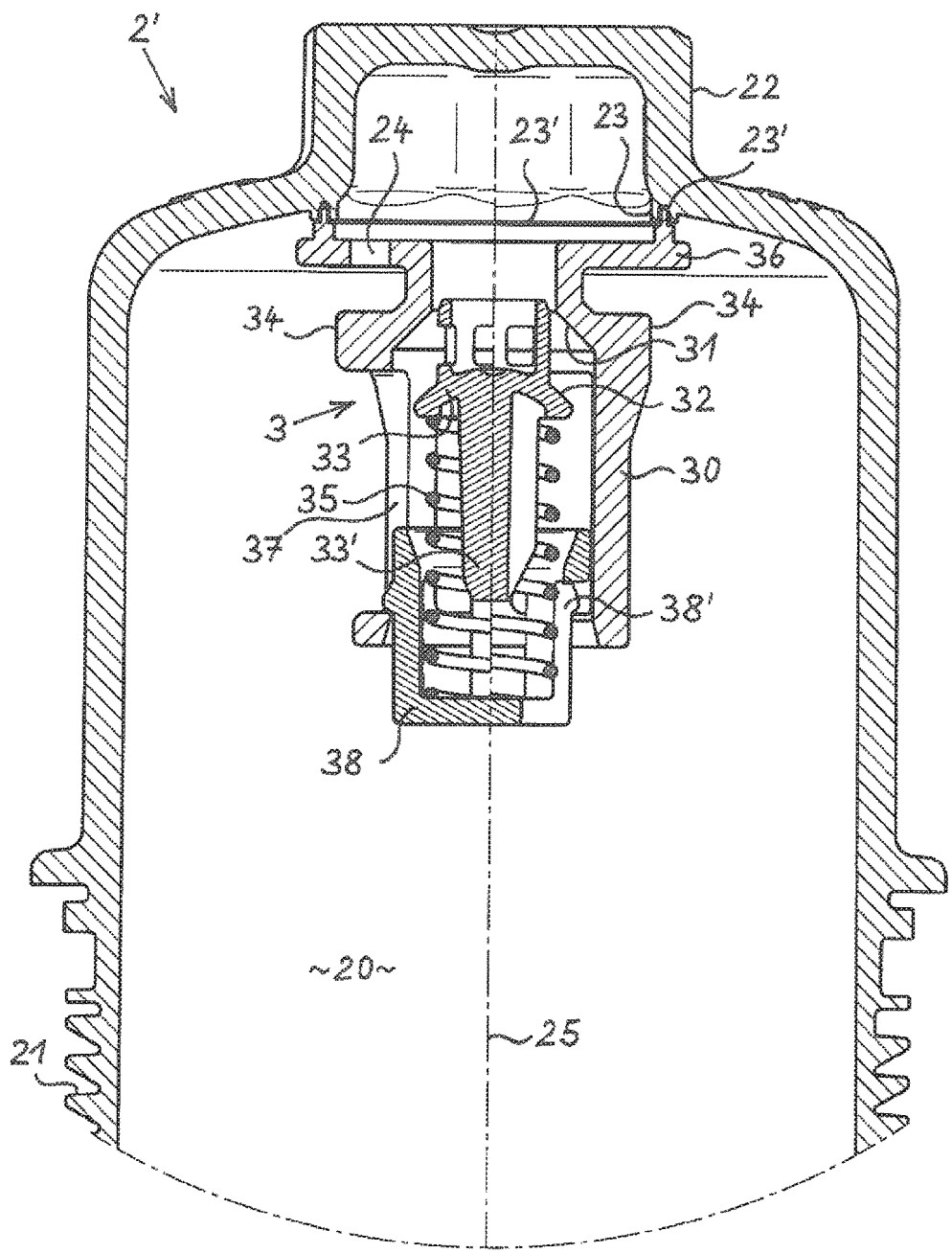
FIG. 3 shows a housing cover of a filter having a filter bypass valve situated therein, in a second embodiment, in longitudinal section.

FIG. 3 shows a housing cover 2' of the filter, with filter bypass valve 3 situated therein, in a second embodiment, in longitudinal section. Filter bypass valve 3 is, in itself, identical to filter bypass 3 according to the example shown in FIGS. 1 and 2. Different here is the connection of filter bypass 30 to housing cover 2' that bears it. In the example of FIG. 3, valve bearer 30 again has a circumferential holding collar 36 at the upper side, here connected to correspondingly shaped holding elements 23 of housing cover 2' by a welded connection 23'. In order to enable a flow of unfiltered liquid from the raw side of the filter to the inflow side of filter bypass valve 3, at least one flow opening 24 is made in holding collar 36.

Figure 4:
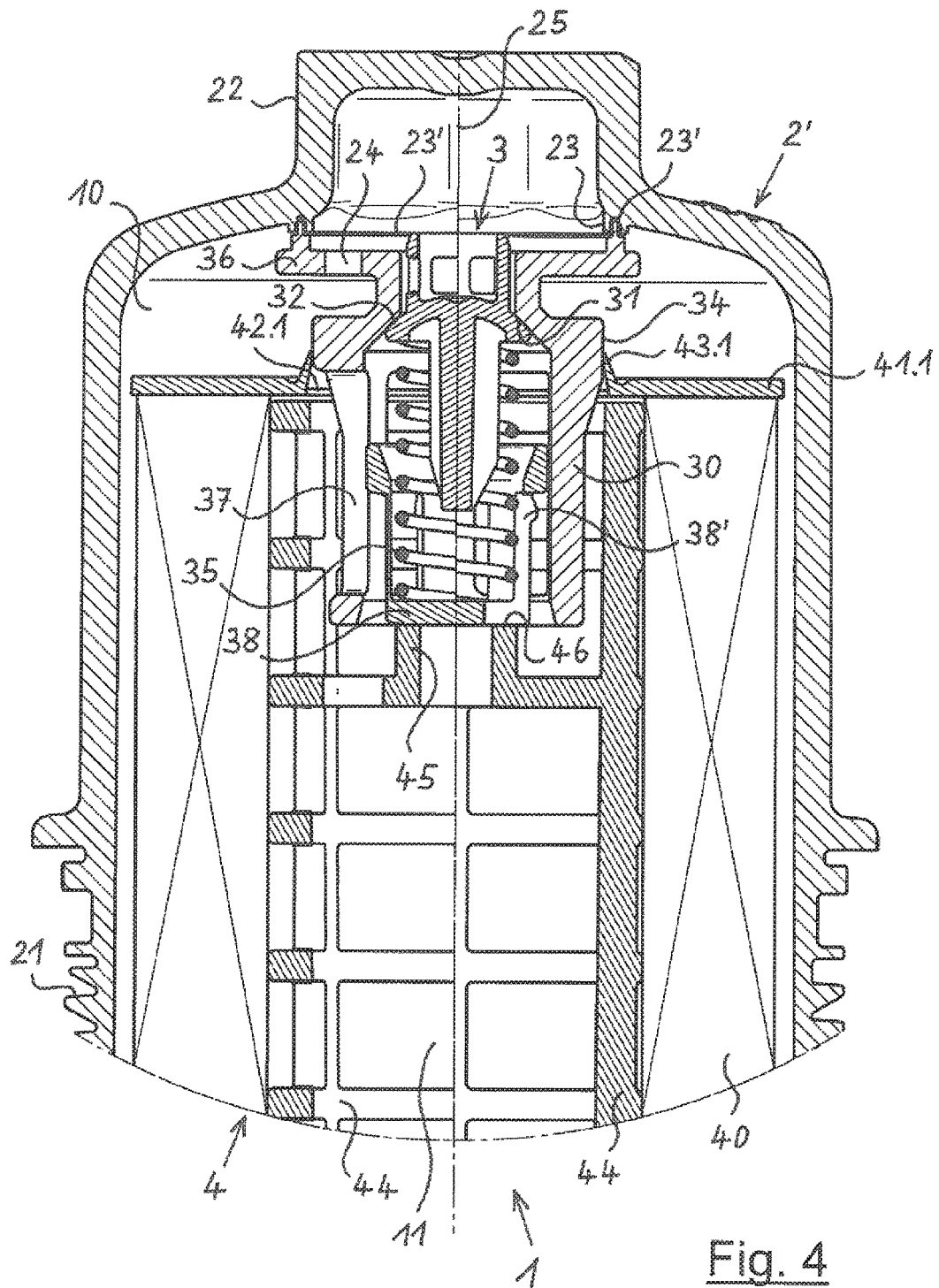
FIG. 4 shows the housing cover of FIG. 3 together with an installed filter cartridge, in longitudinal section.

FIG. 4 shows housing cover 2' of FIG. 3 together with installed filter cartridge 4, in longitudinal section; here again, as in FIG. 2, an associated filter housing to which housing cover 2' is screwed by screw threading 21 is not shown for reasons of clarity.

Filter cartridge 4 in FIG. 4 is identical to filter cartridge 4 in FIG. 2, and also has a spring support 45, made in one piece with supporting body 44, with its support surface 46. In the assembled state shown in FIG. 4, spring support 45 supports, via spring end cap 38, spring 35 of filter bypass valve 3, so that as a result valve body 32 lies on its valve seat 31 so as to be pre-loaded with a specified force. If the pressure difference between raw side 10 and clean side 11 exceeds a specifiable boundary value, valve body 32 is moved downward, and thus into the open position, against the force of spring 35, by the liquid moving through flow opening 24 to the inflow side of filter bypass valve 3, thereby releasing an immediate flow connection from raw side 10 to clean side 11, bypassing filter material body 40.

In filter 1 according to FIG. 4 as well, the opening pressure of filter bypass valve 3 can easily be modified and set to a desired value by modifying the axial length and/or the axial position of spring support 45 in filter cartridge 4.

Figure 5:
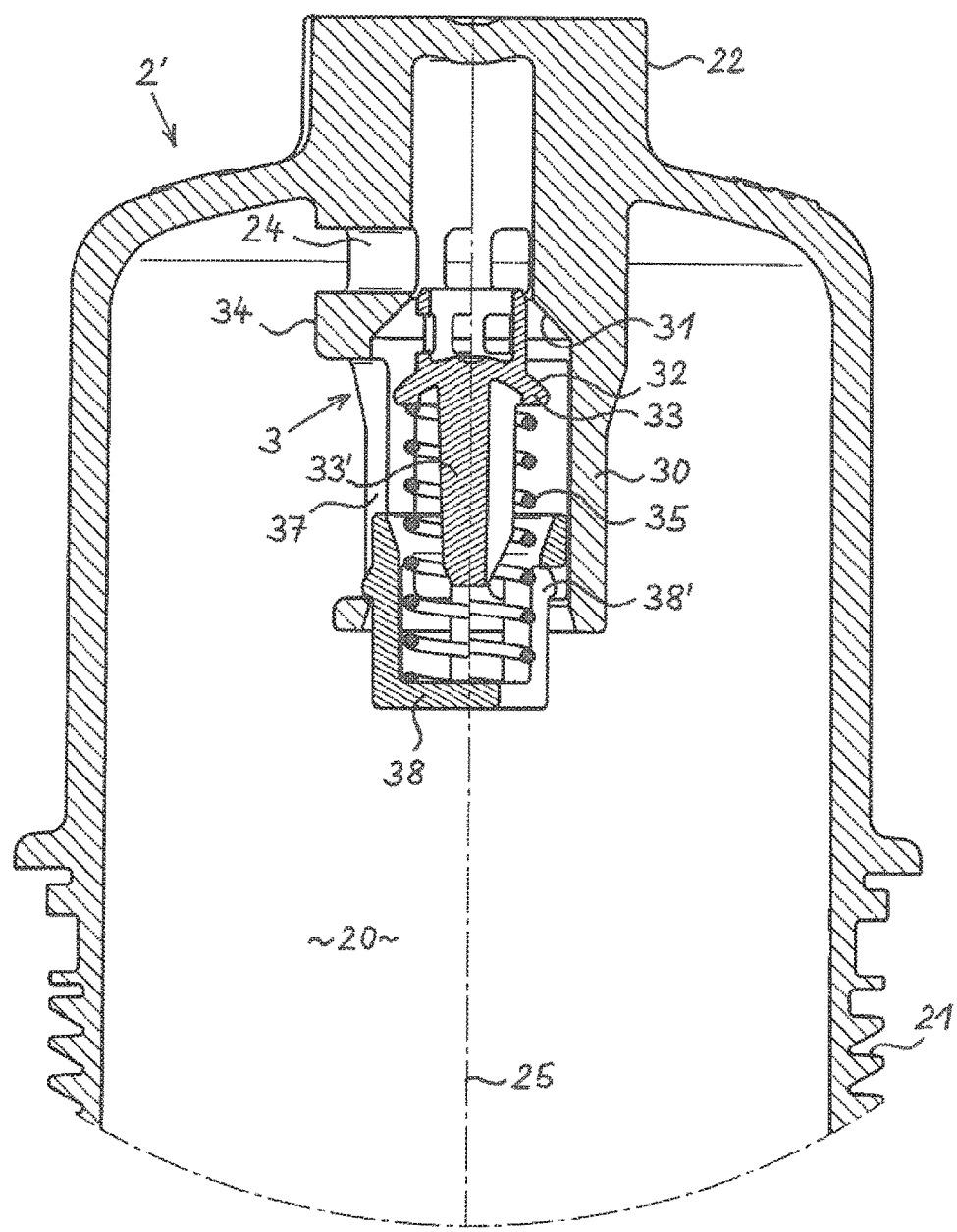
FIG. 5 shows a housing cover of a filter having a filter bypass valve situated therein, in a third embodiment, in longitudinal section.

FIG. 5 shows a housing cover 2' of a filter having a filter bypass valve 3 situated therein, in a third embodiment, in longitudinal section. Characteristic for this exemplary embodiment is that here valve bearer 30 is made in one piece with housing cover 2'. Valve seat 31 is again fashioned in valve bearer 30, which seat interacts with valve body 32, which is guided in valve bearer 30 so as to be capable of axial displacement. Here as well, valve body 32 has a cap-shaped head 33, and a narrow shaft 33' under it. Spring 35 is situated around shaft 33'. The lower part of spring 35 is covered by spring end cap 38, which is connected to valve bearer 30 so as to be capable of limited displacement in the axial direction by locking arms 38' guided in longitudinal slots 37. Raw side 10 of filter 1 is connected to the inflow side of filter bypass valve 3 via a plurality of flow openings 24 that run radially through an upper end region of valve bearer 30.

Figure 6:
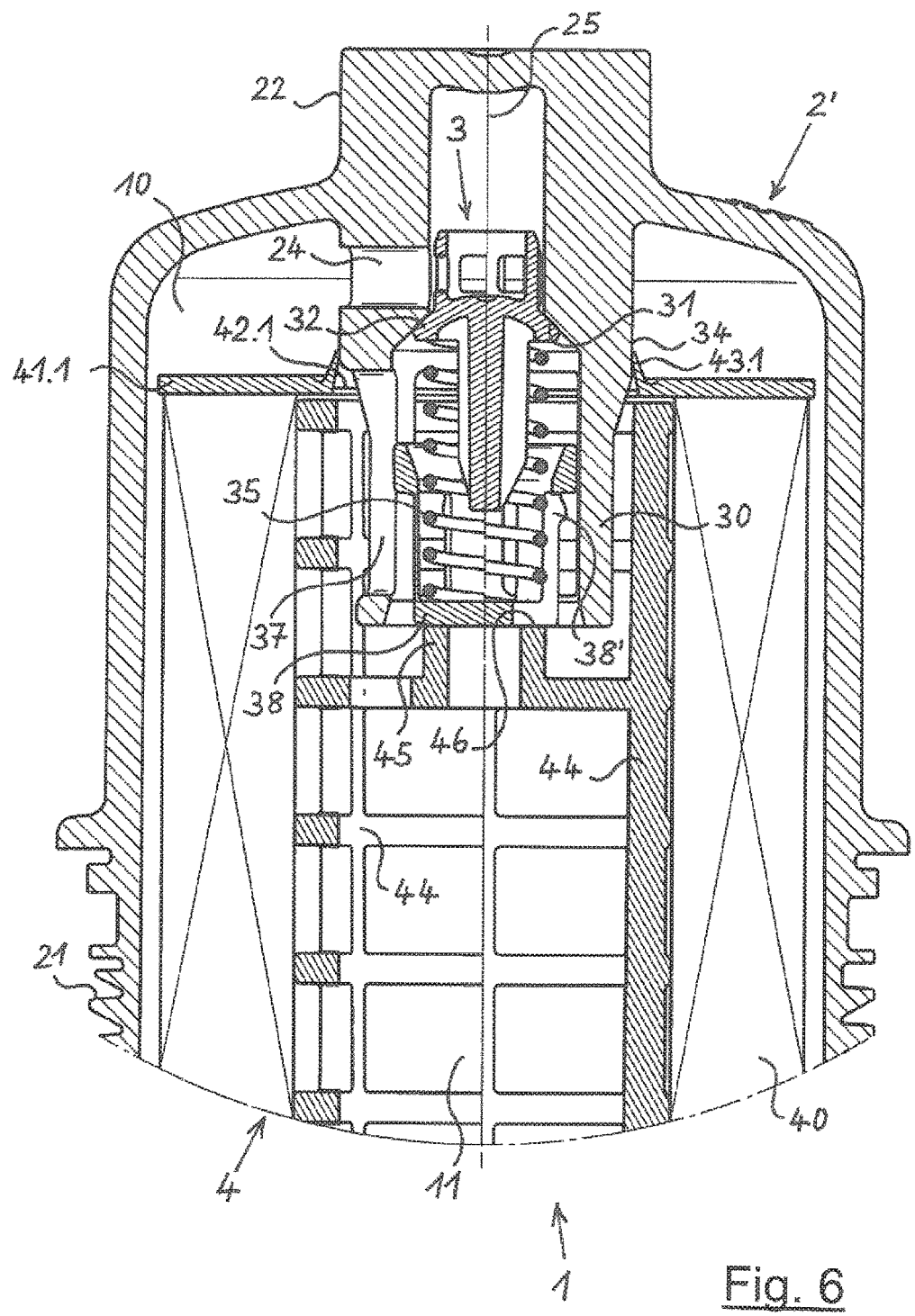
FIG. 6 shows the housing cover of FIG. 5 together with an installed filter cartridge, in longitudinal section.

FIG. 6 shows housing cover 2' of FIG. 5 together with an installed filter cartridge 4 in longitudinal section; here again, as in FIGS. 2 and 4, an associated filter housing to which housing cover 2' is screwed by screw threading 21 is not shown for clarity.

Filter cartridge 4 in FIG. 6 is identical to filter cartridge 4 in FIGS. 2 and 4, and also has spring support 45, made in one piece with support body 44, with its support surface 46. Regarding the interaction of filter cartridge 4 with filter bypass 5 in the embodiment of FIG. 6, reference is therefore made to the above description, in particular of FIGS. 2 and 4.

Figure 7:
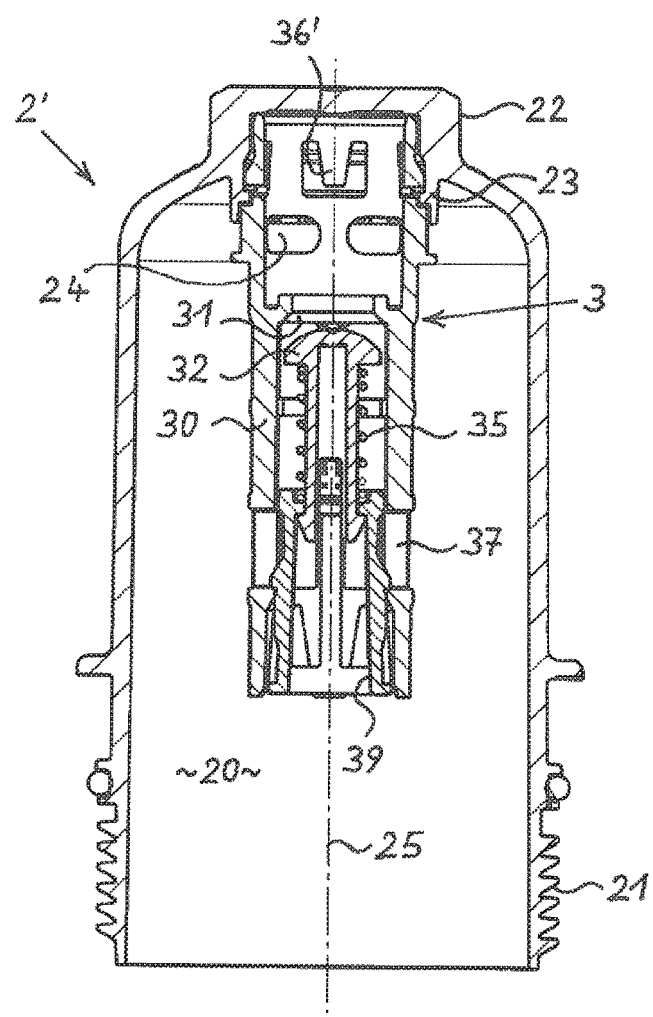
FIG. 7 shows a housing cover of the filter having a filter bypass valve situated therein, in a fourth embodiment, in longitudinal section.

FIG. 7 shows a housing cover 2' of a filter having a filter bypass valve 3 situated therein, in a fourth embodiment, in longitudinal section. Here as well, filter bypass valve 3 is situated concentric to longitudinal mid-axis 25 of housing cover 2', in the interior 20 thereof, and is connected to cover 2', here by locking elements 36' situated at the very top on valve bearer 30, which elements interact with correspondingly shaped holding elements 23 on the inner side of housing cover 2'. Below locking elements 36', in valve bearer 30 a plurality of flow openings 24 are made. Under these, in valve bearer 30 there is situated downward-pointing valve seat 31, under which in turn valve body 32 is situated, guided so as to be capable of axial movement. Spring 35, as a helical pressure spring, is situated around valve body 33, and the lower end of the spring lies on a spring intermediate support 39. Spring intermediate support 39 is guided so as to be capable of limited displacement in the axial direction in longitudinal slots 37 of valve bearer 30.

Because in the state shown in FIG. 7, a filter cartridge has not yet been installed, spring 35 is relaxed, and valve body 32 is situated in its open position, at an axial distance from its valve seat 31.

Figure 8:
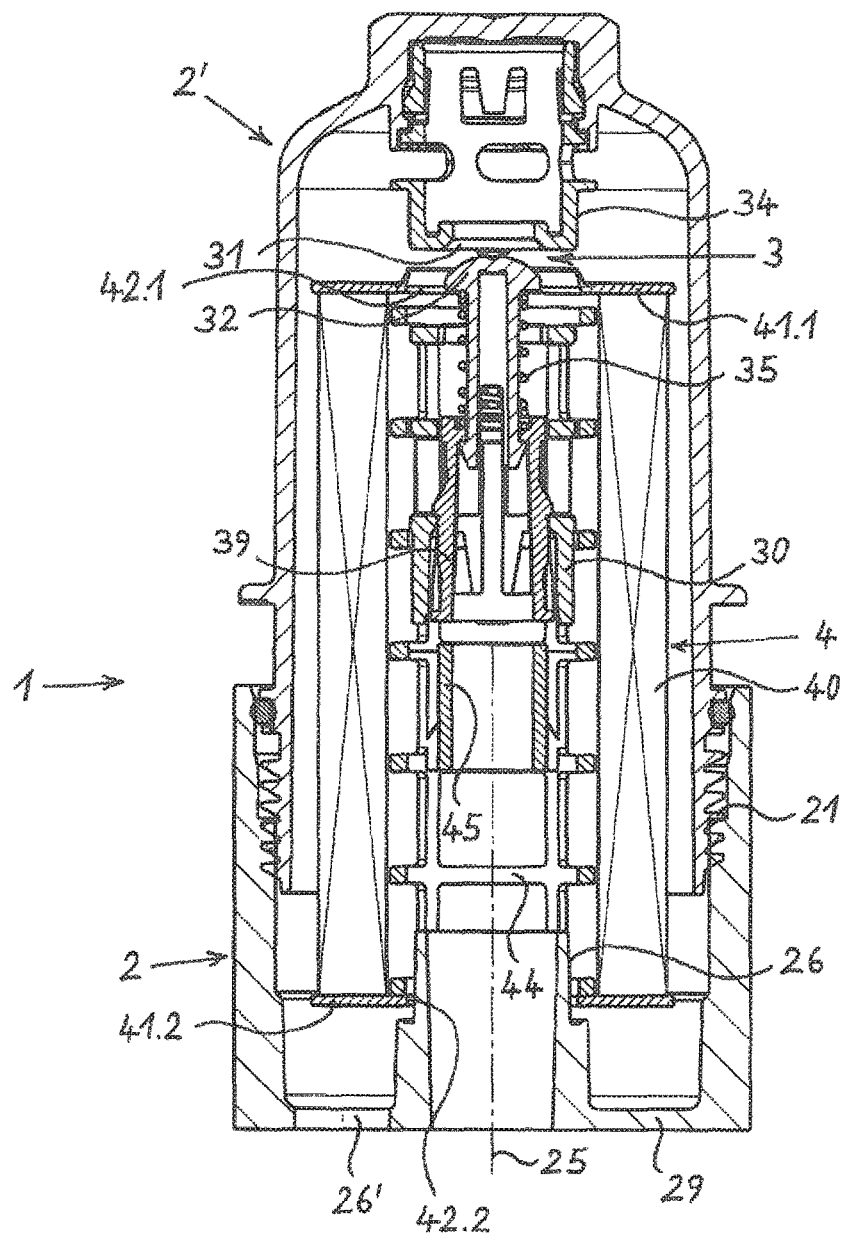
FIG. 8 shows a filter having the housing cover of FIG. 7 together with a filter cartridge and a filter housing during the assembly, in longitudinal section.

FIG. 8 shows a filter 1 having housing cover 2' of FIG. 7 together with a filter cartridge 4 and a filter housing 2 during assembly, in longitudinal section, housing cover 2' being first screwed partly onto filter housing 2 by screw threading 21. Filter cartridge 4 is plugged onto a pipe socket-shaped outlet 26 of filter housing 2 with central opening 42.2 provided in its lower end plate 41.2. Filter bypass valve 3, which forms a component of housing cover 2', is placed onto filter cartridge 4 and filter housing 2 from above, filter bypass valve 3 with valve bearer 30 being immersed into the interior of filter cartridge 4 through central opening 42.1 in upper end plate 41.1. In the incomplete state of assembly shown in FIG. 8, spring intermediate support 39 is still at a small axial distance from spring support 45 provided on support body 44 of filter cartridge 4. As a result, spring 35 of filter bypass valve 3 is not yet pre-tensioned, and valve body 32 is still at a distance from its valve seat 31.

Figure 9:
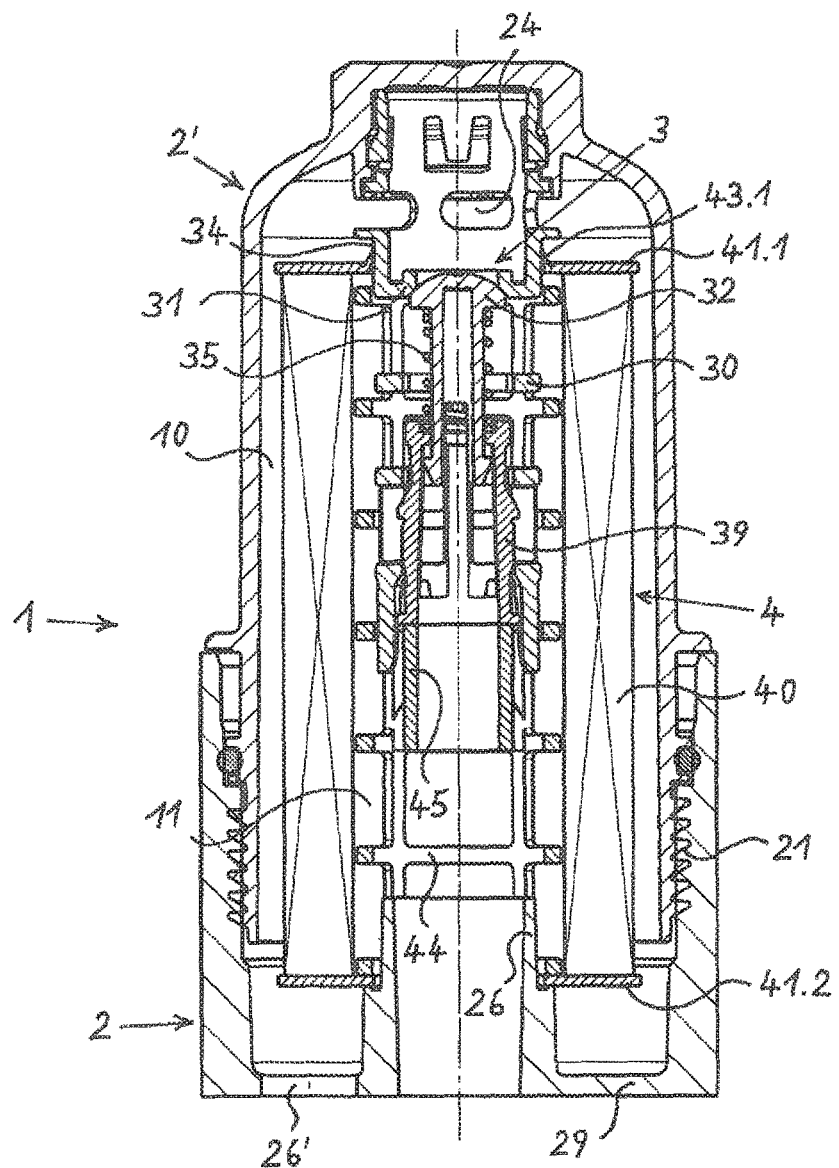
FIG. 9 shows the filter of FIG. 8 in the finally assembled state, in longitudinal section.

FIG. 9 shows the filter of FIG. 8 in the finally assembled state in longitudinal section. Filter cartridge 4 now is seated with its lower end plate 41.2 on a stop on the foot of pipe socket-shaped outlet 26, so that it cannot move further downward inside filter housing 2. Spring support 45 is now seated on the underside of spring intermediate support 39, and has now displaced it upward by a certain extent compared to the state shown in FIG. 8, whereby spring 35 is now correspondingly pre-tensioned, and presses valve body 32 against valve seat 31 with a specified force.

In normal operation of filter 1, a liquid to be filtered flows through an inlet 26' provided in the floor of filter housing 2, to the raw side 10 of filter 1, and from there flows through filter material body 40 of filter cartridge 4, to the clean side 11 of filter 1. From there, the filtered liquid flows out through outlet 26. If the filter material body 40 becomes increasingly stopped up after a longer operating time, then a difference pressure between raw side 10 and clean side 11 increases, until finally the pressure difference becomes so large that, due to the difference, valve body 32 of filter bypass valve 3 is moved away from valve seat 31 against the force of spring 35, and thus opens filter bypass valve 3. In this state, a flow path is then open from raw side 10 via flow openings 24 and through the now-open filter bypass valve 3 to clean side 11, so that liquid can flow through filter 1 while bypassing filter material body 40.

Figure 10:
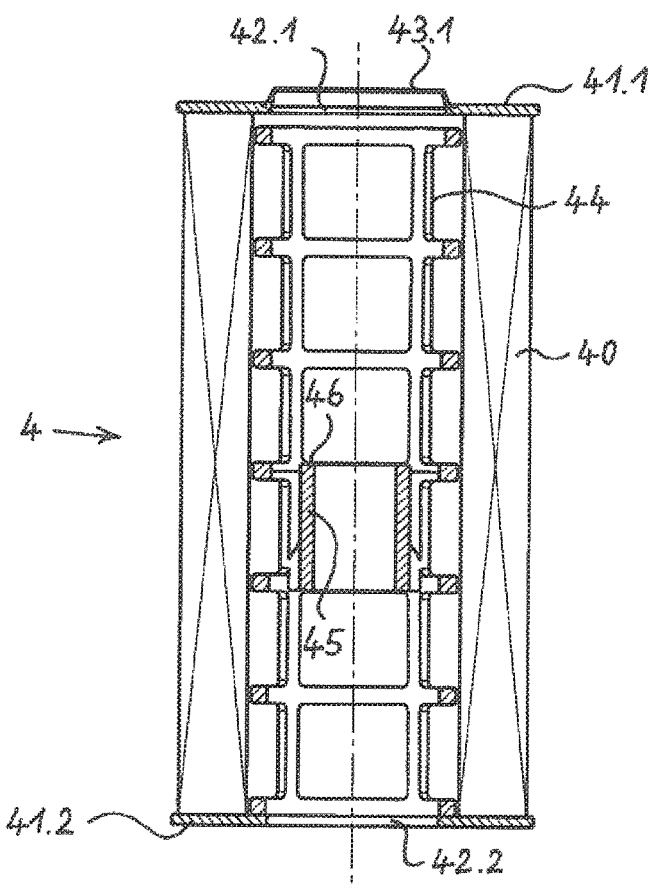
FIG. 10 shows the filter cartridge of the filter of FIGS. 8 and 9 as an individual part, in longitudinal section.

FIG. 10 shows filter cartridge 4 of filter 1 of FIGS. 8 and 9 as an individual part, in longitudinal section. At left and right in FIG. 10, hollow cylindrical filter material body 40 can be seen, made up for example of a zig-zag-shaped folded filter paper. At the top, filter material body 40 is covered by upper end plate 41.1, which is provided with central opening 42.1 and radial seal 43.1 surrounding it. On the lower side, filter material body 40 covers lower end plate 41.2, which is provided with central opening 42.2. Grid-shaped support body 44 is situated inside filter material body 40, with which spring support 45 is made in one piece, with its upward-oriented support surface 46.

Figure 11:
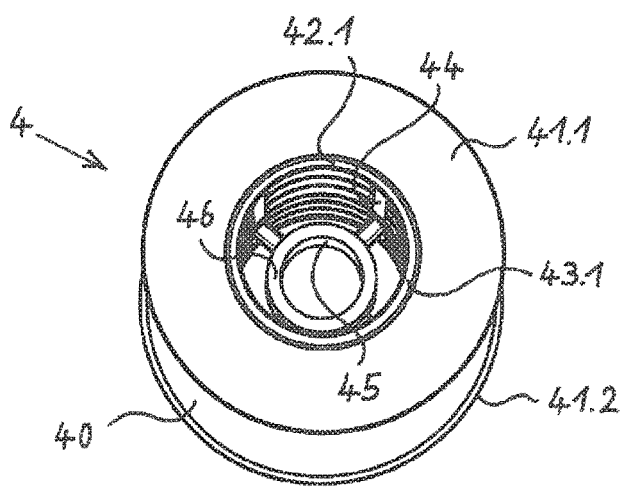
FIG. 11 shows the filter cartridge of FIG. 10 in a slightly oblique plan view.

FIG. 11 shows filter cartridge 4 of FIG. 10 in a slightly oblique top view, the view of the observer falling onto upper end plate 41.1 with its central opening 42.1 and seal 43.1 surrounding this opening. In the interior of filter cartridge 4, support body 44 can be seen, with spring support 45 fashioned in one piece therewith, and its upward-oriented support surface 46. At bottom in FIG. 11, lower end plate 41.2 is situated, which covers filter material body 40 on its lower side.

Figure 12:
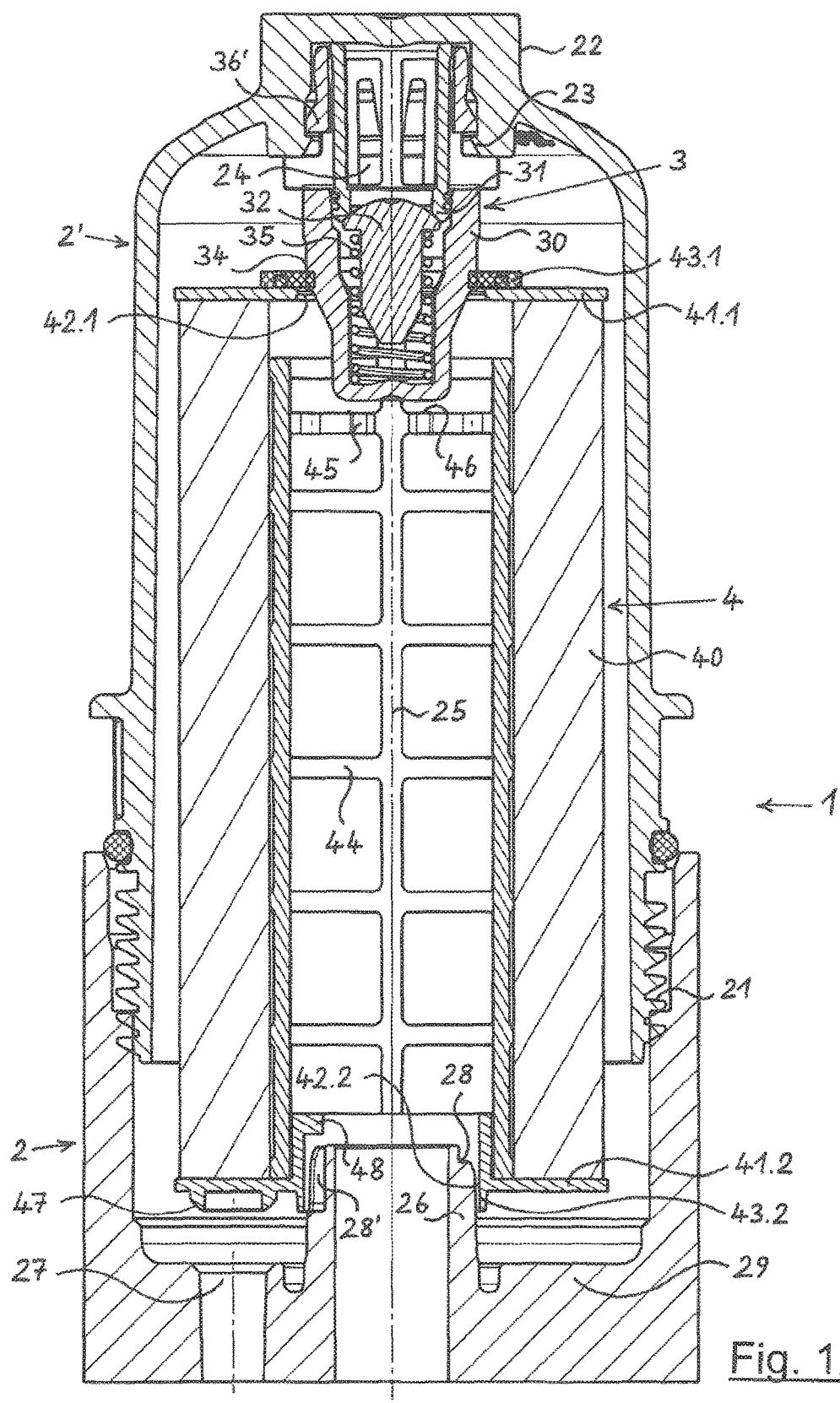
FIG. 12 shows a filter with a housing cover, a filter cartridge, and a filter housing during assembly, in a further embodiment, in longitudinal section.

FIG. 12 shows a filter 1 having a housing cover 2' with filter bypass valve 3, a filter cartridge 4, and a filter housing 2 during assembly, in a further embodiment, in longitudinal section. Here, filter bypass valve 3 is again a part of housing cover 2', and is connected therewith via valve-side locking elements 36' and cover-side holding elements 23.

Here, differing from the exemplary embodiments described above, filter housing 2 has an eccentric drain opening 27 in its floor 29 that is used to first empty filter 1 during maintenance of filter 1 with removal of filter cartridge 4. During running operation of filter 1, in contrast, a tight seal of drain opening 27 must be provided. A sealing element 47, here integrally formed on the underside of lower end plate 41.2 of filter cartridge 4, is used to seal drain opening 27. Here, positioning guide means are provided on filter cartridge 4 and on outlet 26, which here as well is fashioned in the form of a pipe socket, in order to ensure that sealing element 47 moves so as to cover drain opening 27 that is to be sealed when filter cartridge 4 is installed in filter housing 2. At the side of filter cartridge 4, the positioning guide means is a radially inward-protruding tab 48 that is made in one piece with lower end plate 41.2. On the side of pipe socket-shaped outlet 26, the positioning means is a ramp 28 having the form of a helical line and running on the outer circumference of outlet 26, which ramp opens into an axial groove 28' that can be seen in FIG. 12 on the outside of pipe socket-shaped outlet 26. When filter cartridge 4 is placed onto outlet 26 from above, in any arbitrary rotational position relative to filter housing 2, tab 48 moves onto helical ramp 28 and can then slide downward obliquely onto the ramp, with rotation of filter cartridge 4, until tab 48 enters into groove 28'. In this position of filter cartridge 4 relative to filter housing 2, sealing element 47 on lower end plate 41.2 is positioned so as to coincide with and cover drain opening 27, so that now, through further displacement of filter cartridge 4 in the axial direction downward, drain opening 27 can be sealed.

At the same time, during this assembly process, spring 35 is supported at its lower end, facing away from valve body 32, and in this way is pre-tensioned, by means of spring support 45, which here as well forms a one-piece component of support body 44, with its support surface 46.

Figure 13:
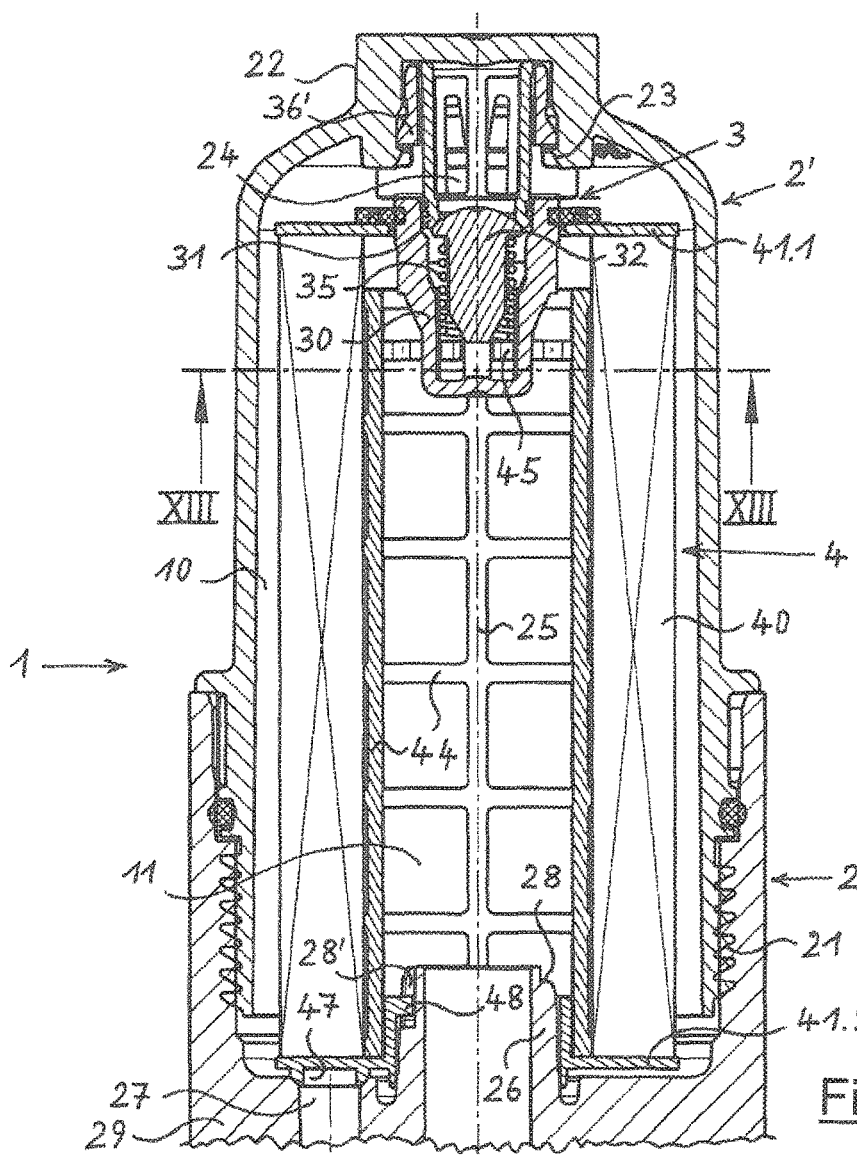
FIG. 13 shows the filter of FIG. 12 in the finally assembled state, in longitudinal section.

FIG. 13 shows filter 1 of FIG. 12 in the finally assembled state, also in longitudinal section. Filter cartridge 4 is now in its lower end position, in which it tightly seals drain opening 27 with its sealing element 47. At the same time, spring support 45 lies against spring 35, and pre-tensions the spring, thereby pressing valve body 32 onto valve seat 31 with a specified force.

At the same time, spring 35 ensures that filter cartridge 4 is charged with a downward-oriented force that provides a reliably sealing seating of sealing element 47 on drain opening 27.

Figure 14:
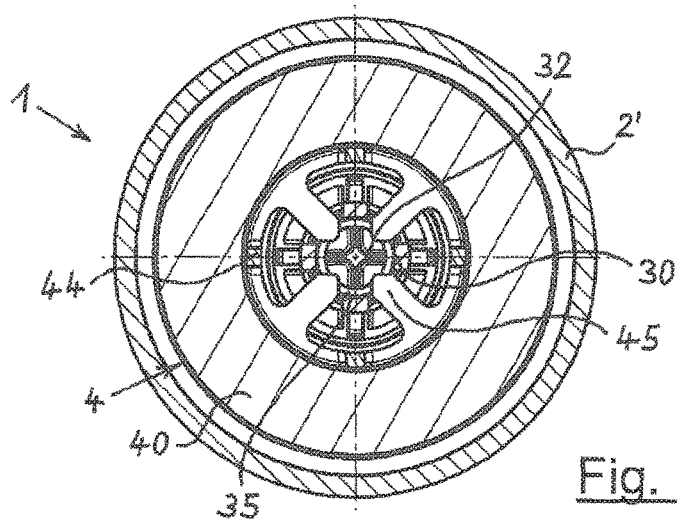
FIG. 14 shows the filter of FIG. 13 in cross-section along the line XIII-XIII in FIG. 13.

FIG. 14 shows the filter of FIG. 13 in cross-section according to the line XIII-XIII in FIG. 13. Housing cover 2' is sectioned radially externally. Radially inwardly therefrom is situated filter material body 40 of filter cartridge 4. In the center of FIG. 14, spring support 45 is visible, which is part of support body 44 and supports spring 35 on its lower end, here facing the observer. Inside spring 35, the underside of valve body 32 can still be seen.

Figure 15:
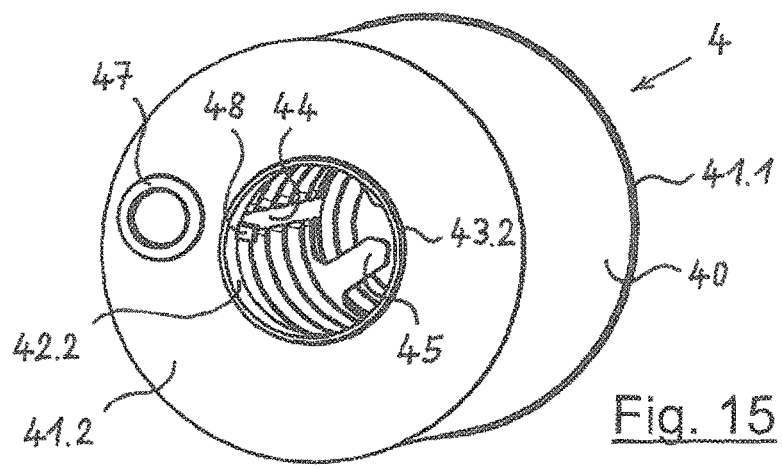
FIG. 15 shows the filter cartridge of FIG. 13 in a slightly oblique view from below.

FIG. 15 shows filter cartridge 4 of FIG. 13 in a slightly oblique lower view, the view of the observer falling on the underside of lower end plate 41.2. In the center of end plate 41.2 there is situated opening 42.2, through which a part of support body 44 with spring support 45 is visible. Sealing element 47 is situated to the left of opening 42.2, on the underside of end plate 41.2. At right in FIG. 15, filter material body 40 can be seen from outside, whose upper end face, oriented away from the viewer, is covered by upper end plate 41.1.

Figure 16:
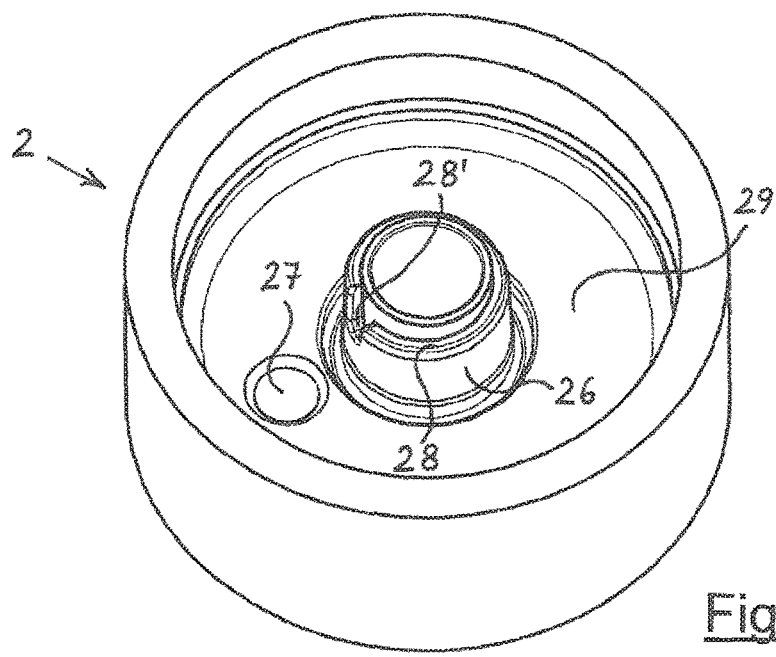
FIG. 16 shows the filter housing of the filter of FIGS. 12 and 13 as an individual part, in an oblique view from above.

FIG. 16 shows filter housing 2 of filter 1 of FIGS. 12 and 13 as an individual part, in an oblique view from above, the view of the observer falling on floor 29. In the center of the floor there is situated central outlet 26, in the shape of a pipe socket, having helical ramp 28 and axial groove 28' on its outer circumference. To the left of outlet 26, eccentric drain opening 27 is visible.

Figure 17:
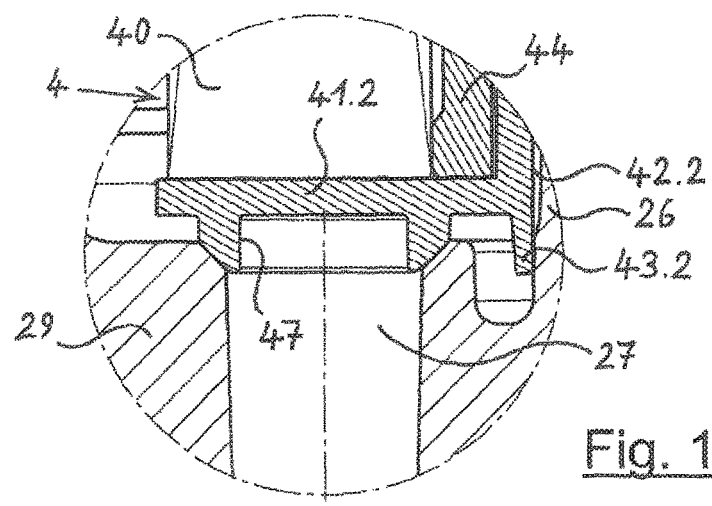
FIG. 17 shows a detail at lower left from FIG. 13, with the drain opening and sealing element, in an enlarged representation, in longitudinal section.

FIG. 17 shows a detail from the lower right from FIG. 13, with drain opening 27 and sealing element 47 in an enlarged representation, in longitudinal section. In the lower part of FIG. 17, a small part of floor 29 of filter housing 2 is visible. Above that, a part of lower end plate 41.2 and of the filter material body 40 encompassed thereby at the lower side, and support body 44, situated therein, of filter cartridge 4 are visible. At the far right in FIG. 17, a small part of outlet 26 is still visible, on which filter cartridge 4 is plugged with its central opening 42.2, with sealing by radial seal 43.2. Here, sealing element 47 lies coincident with and in sealing fashion on drain opening 27, and seals it.

FIGS. 18 through 22 show further embodiments of sealing element 47 of filter cartridge 4 and of drain opening 27, in the same detailed representation as shown in FIG. 17. Here, sealing element 47 is in each case in its closed position relative to drain opening 27.

Figure 18:
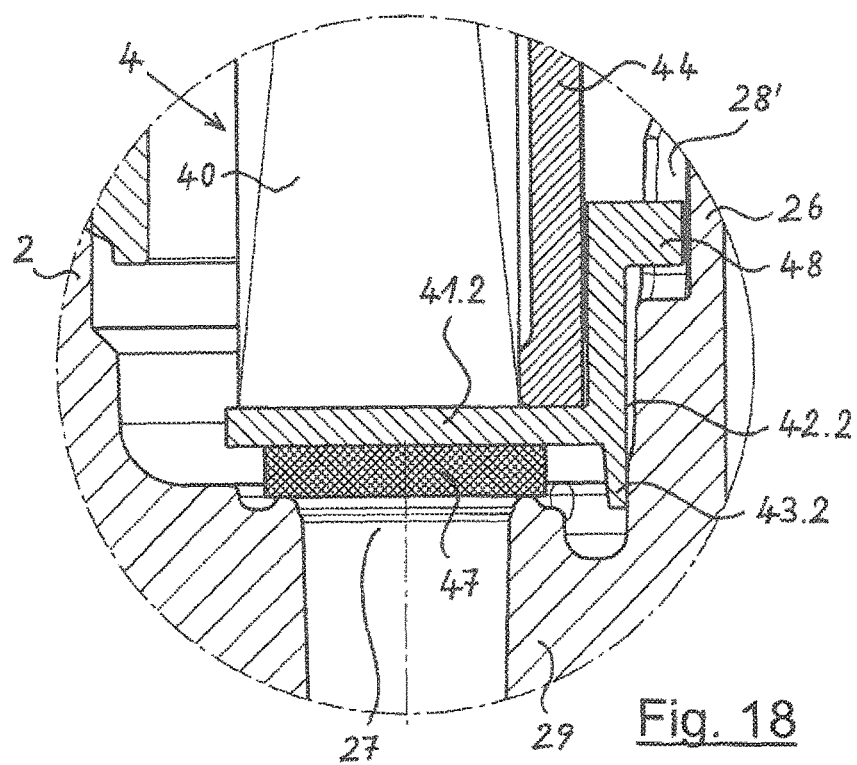
FIGS. 18 through 22 show further embodiments of the sealing element of the filter cartridge, in the same detail representation as in FIG. 17.

FIG. 18 shows an example in which sealing element 47, as a disc made of an elastic sealing material, such as an elastomer, is attached, e.g., glued or welded, on the underside of lower end plate 41.2 of filter cartridge 4.

Figure 19:
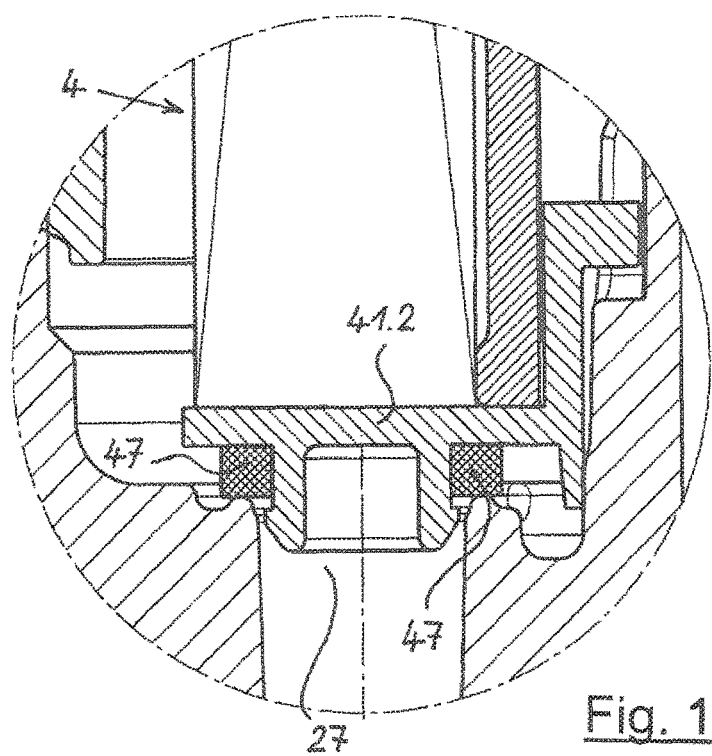

In the example in FIG. 19, sealing element 47 is realized as a sealing ring made of sealing material and is held, at its radially inner circumference, on a holding contour that is integrally formed on the lower side of end plate 41.2.

Figure 20:
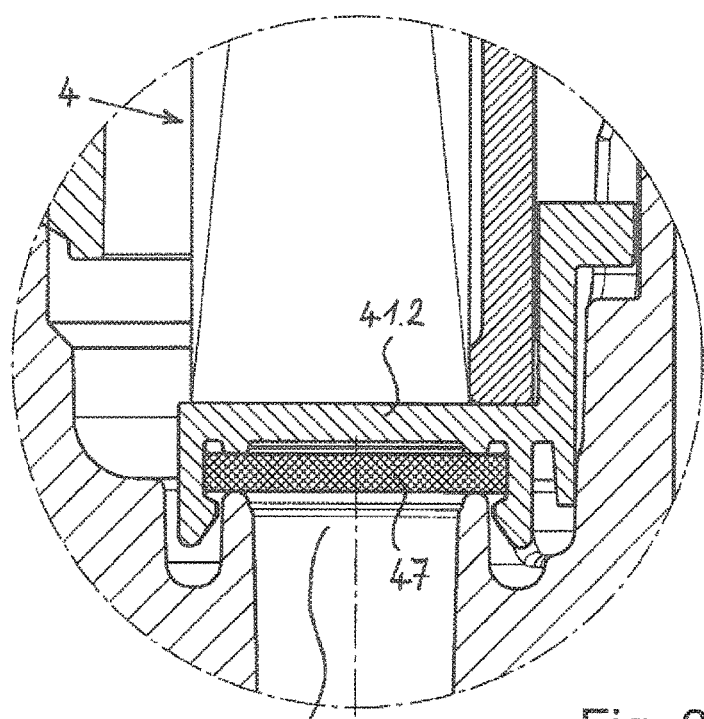

In the example in FIG. 20, sealing element 47 is realized as a sealing plate made of sealing material, and is held, at its radially outer circumference, on a holding contour that is integrally formed on the lower side of end plate 41.2.

Figure 21:
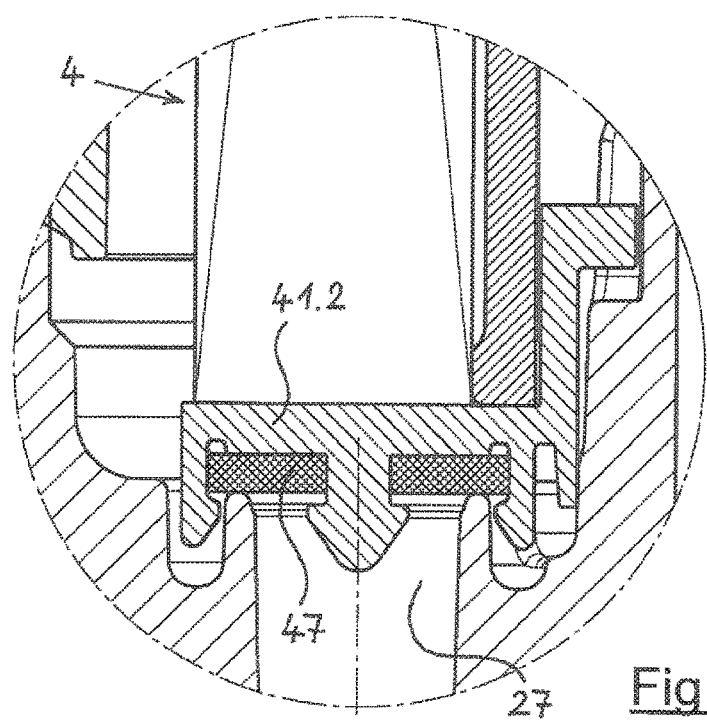

In the example in FIG. 21, sealing element 47 is realized in the form of a circular ring having a central perforation by which sealing element 47 is plugged onto a holding mandrel or mushroom that is integrally formed on the lower side of end plate 41.2. In addition, sealing element 47 is here held at its outer circumference as in the example of FIG. 20.

Figure 22:
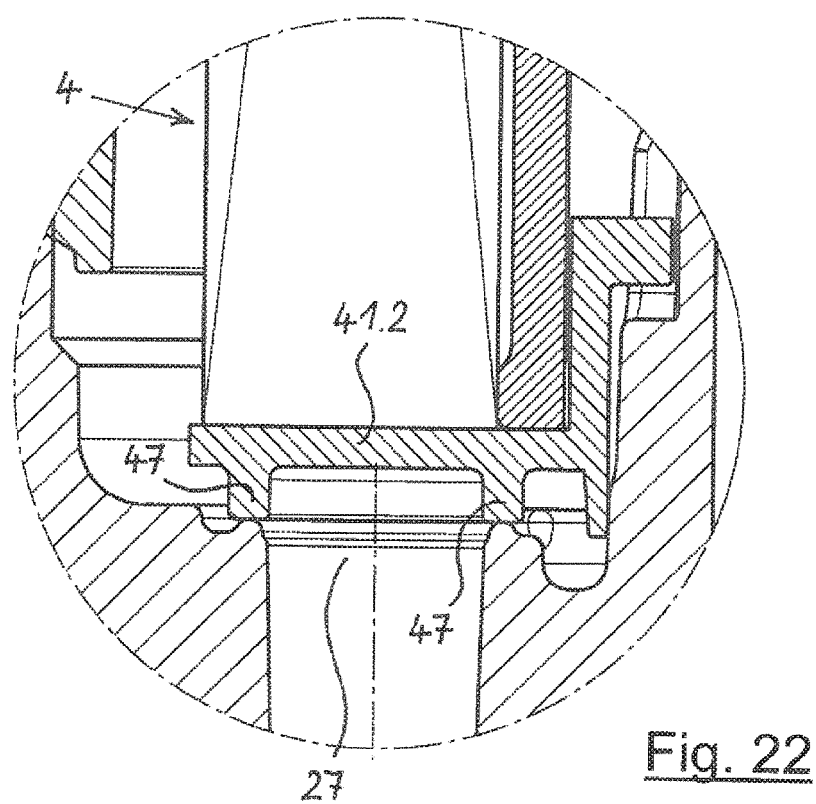

In the example in FIG. 22, sealing element 47 is made, in the form of a ring, in one piece with lower end plate 41.2 of filter cartridge 4, and, fitting thereto, drain opening 27 is realized having a raised circumferential edge. Here, usefully the entire lower end plate 41.2 of filter cartridge 4 is made of a material that has adequate sealing properties, such as thermoplastic elastomer.

Alternatively, the edge region of drain opening 27, which interacts with sealing element 47, can be made of a material having sealing properties or can be filled with such a material in order to ensure a good tightness.

Figure 23:
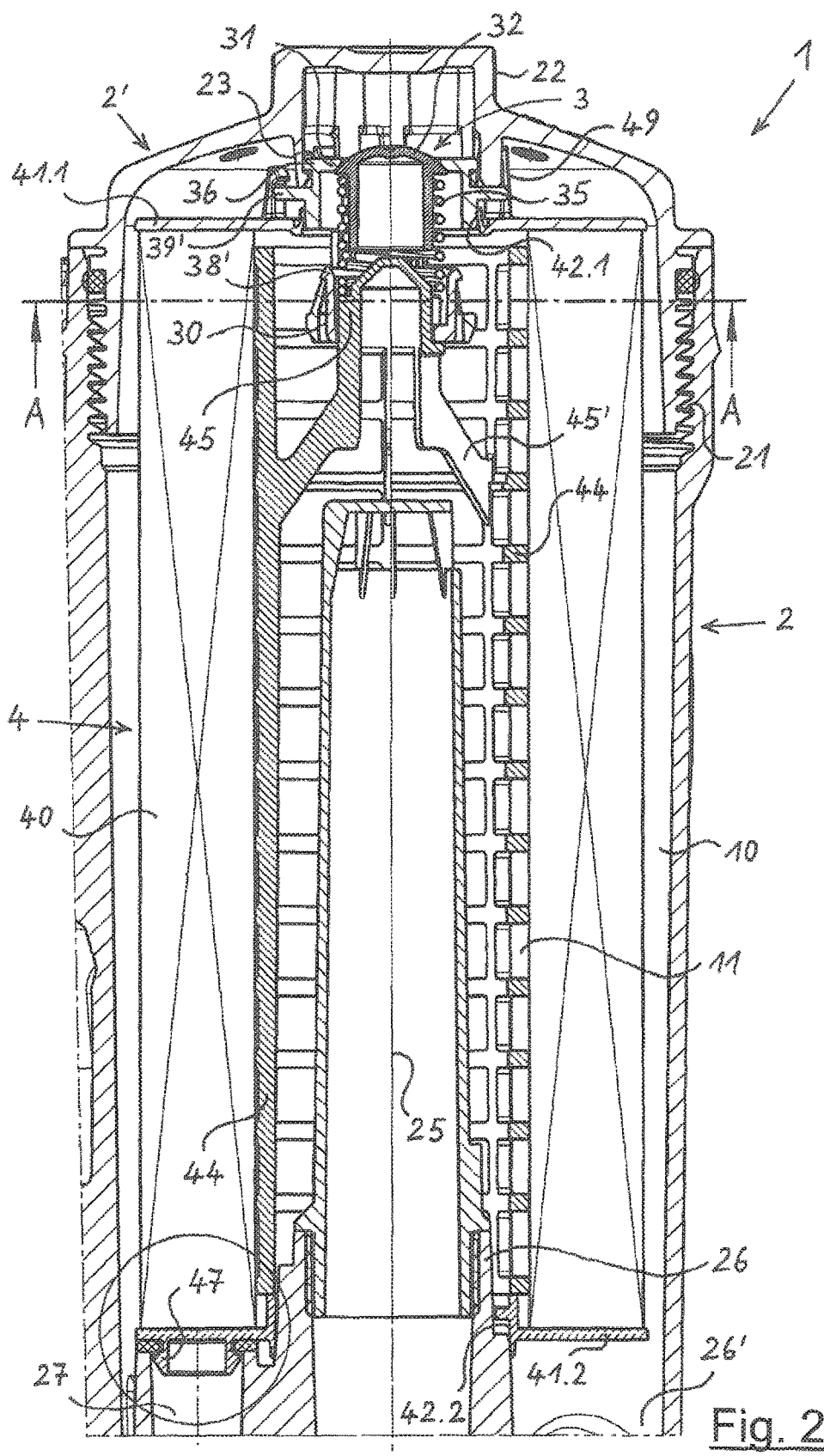
FIG. 23 shows the filter with installed filter cartridge and attached housing cover with filter bypass valve, in a modified embodiment, in longitudinal section.

FIG. 23 shows a filter 1 having an installed filter cartridge 4 and having a housing cover 2' attached on filter housing 2, here screwed on by screw threading 21, the cover having filter bypass valve 3, in a modified embodiment, in longitudinal section.

Filter cartridge 4 situated in filter 1, with its filter material body 40 and the two end plates 41.1, 41.2 enclosing this body at its end faces, is plugged in sealing fashion, with its lower end plate 41.2 and central opening 42.2 provided therein, onto central pipe socket-shaped outlet 26, and separates raw side 10 and clean side 11 of filter 1 from one another. In FIG. 23, to the right of outlet 26, inlet 26' for the liquid to be filtered is situated; to the left of outlet 26 there is situated drain opening 27 that is used to empty filter 1 when there is a change of filter cartridge 4. In the operating state of filter 1, as is shown in FIG. 23, drain opening 27 is sealed by sealing element 47 on lower end plate 41.2.

With central opening 42.1 in upper end plate 41.1, filter cartridge 4 is plugged onto valve bearer 30 of filter bypass valve 3 connected to housing cover 2', and in this position the cartridge is held on valve bearer 30 in locking fashion by a plurality of locking arms 49 on the upper side of upper end plate 41.1 and a locking collar 39'.

Valve bearer 30 of filter bypass valve 3 is, for its part, locked by its holding collar 36 to holding elements 23 in the form of locking tongues on housing cover 2'. In addition, valve bearer 30 is made up of two bearer parts that lock to one another by means of locking arms 38', which parts hold spring 35 captive in valve bearer 30.

In this exemplary embodiment as well, valve body 32 is guided in valve bearer 30 so as to be capable of axial displacement, i.e., displacement in the direction of longitudinal mid-axis 25 of filter 1. Spring 35, which partly surrounds valve body 32, presses valve body 32 against valve seat 31 formed in the upper part of valve bearer 30, i.e., pre-loads it in the closing direction. The pre-tension of spring 35 is provided by spring support 45, which is connected to or made in one piece with support body 44 situated in the interior of filter material body 40, here via a plurality of spokes 45' that are distributed in the circumferential direction and that run obliquely inward and upward.

For a desired modification of the opening pressure of filter bypass valve 3, in this embodiment of filter 1 it is also sufficient to modify the axial position or length of spring support 45, thereby correspondingly modifying the pre-loading force of spring 45. Interventions at other parts of filter bypass valve 3, or of the rest of filter 1, are also not required here if a modified opening pressure of filter bypass valve 3 is desired.

Figure 24:
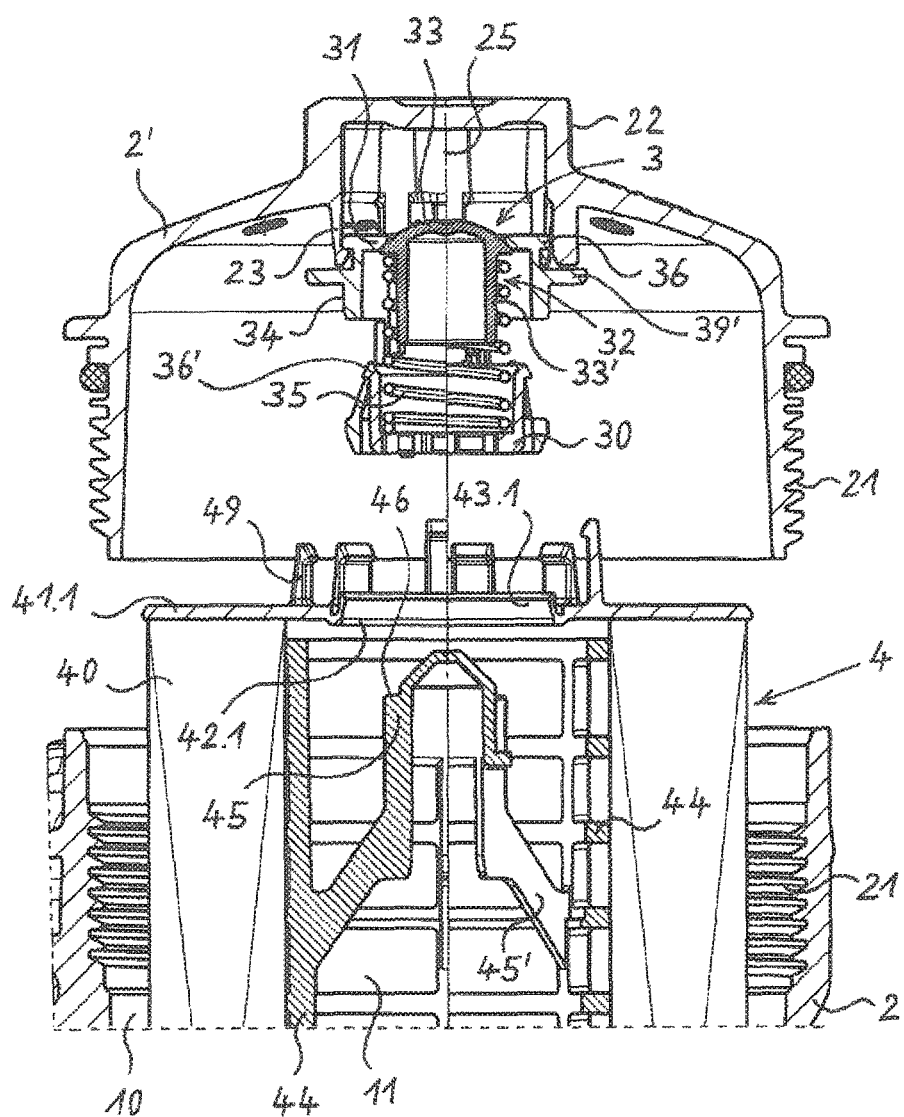
FIG. 24 shows the housing cover and an upper part of the filter housing of the filter of FIG. 1 before the attachment of the housing cover, in longitudinal section.

FIG. 24 shows, in longitudinal section, housing cover 2' and an upper part of filter housing 2 of the filter of FIG. 1 before the attachment of housing cover 2', housing cover 2' still being at a distance upwardly from filter housing 2. Filter bypass valve 3 is locked to housing cover 2', and forms, with all its individual parts with the exception of spring support 45, a part of housing cover 2'. Spring 35 of filter bypass valve 3, here also realized as a helical pressure spring, again lies with its upper end against valve body 32. The lower end of spring 35, which here is still entirely or largely relaxed, lies against a lower part of the two-part valve bearer 30, so that the spring cannot fall out from valve bearer 30.

Here as well, valve body 32 has a cap-shaped head 33, and a shaft 33' under it, around which spring 35 extends over a part of its length.

Figure 25:
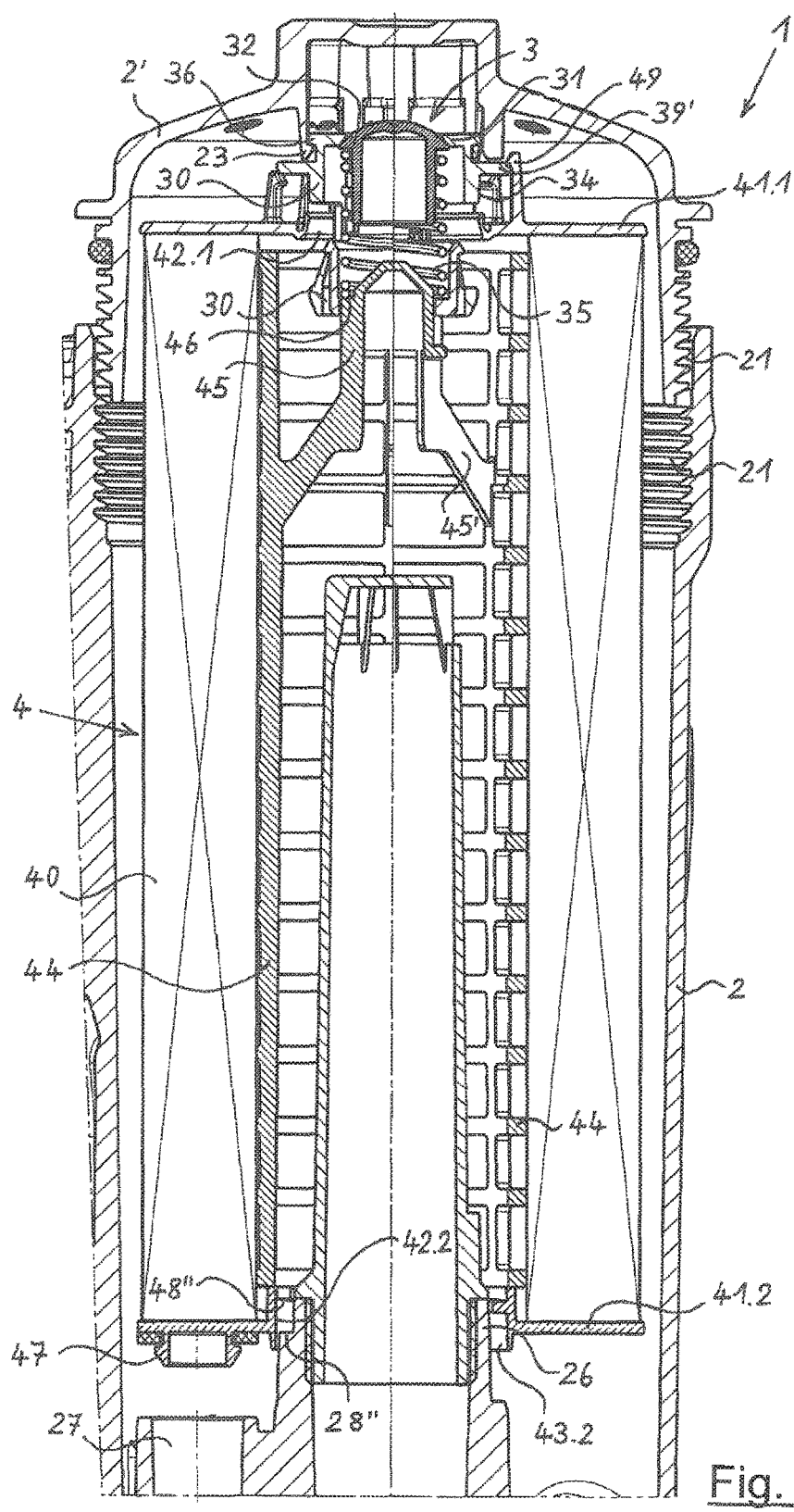
FIG. 25 shows the filter of FIG. 23 during the attachment of the housing cover, in longitudinal section.

Underneath housing cover 2' with filter bypass valve 3, the upper region of filter housing 2 and an upper part of filter cartridge 4 are visible. Here, filter cartridge 4 is already loosely plugged into filter housing 2, and, as is shown below in FIG. 25, is already seated with its lower end plate 41.2 and central opening 42.2 attached therein on pipe socket-shaped outlet 26, but is not yet in the final installed position.

In upper end plate 41.1 there is situated central opening 42.1, surrounded by radial seal 43.1.

From the upper side of upper end plate 41.1, locking arms 49 extend upward, locking arms 49 having two different heights or lengths and being present in a mixed configuration. The use of locking arms 49 having two different heights or lengths provides a safety function for the case in which, when moving filter cartridge 4 out of filter housing 2, during the unscrewing of housing cover 2' from filter housing 2, the first, shorter or lower locking arms 49 detach in undesired fashion from locking collar 39'; there then still remain the second, higher or longer locking arms 49, which maintain the locking engagement with locking collar 39'. In this way, the desired carrying along of filter cartridge 4 and the removal of sealing element 47 from drain opening 27 when housing cover 2' is unscrewed from filter housing 2 is ensured in a particularly reliable manner.

In the interior of filter material body 40, there is situated support body 44, which supports the filter material body, with which spring support 45 is connected in one piece via spokes 45'. Close to its upper end, spring support 45 has a support surface 46 on which the lower end of spring 35 is supported, in centered and positionally secured fashion, in the assembled state of filter 1.

In order to connect housing cover 2' with filter housing 2, housing cover 2' is first moved downward in the axial direction and is then set into rotation in order to bring screw connection 21 into engagement. This stage of the connecting is shown in FIG. 25. Here, housing cover 2' already extends into filter housing 2 to a certain extent, but is still at a distance from its final connecting position. Spring support 45 with its support surface 46 extends from below into valve bearer 30, and is now already seated on the lower end of spring 35. At the same time, a first locking of filter cartridge 4 with valve bearer 30 via some of the locking arms 49 has already taken place.

When housing cover 2' is rotated in the insertion direction, housing cover 2' with filter bypass valve 3 moves further downward, that is, in the direction toward filter housing 2. Here, via sliding friction that exists between valve bearer 30 and filter cartridge 4, a common rotation of filter cartridge 4 with housing cover 2' is brought about, and along with this the filter cartridge is moved downward, that is further into filter housing 2.

Sealing element 47 on lower end plate 41.2, which is used to seal drain opening 27, is compulsorily guided into a position ready for engagement by means of a ramp 48" on the lower end of support body 44 and a tab 28" that interacts therewith on the outer circumference of pipe socket-shaped outlet 26. As soon as the step formed in ramp 48" meets tab 28", a further rotation of filter cartridge 4 relative to filter housing 2 is prevented, and only a further axial advance of filter cartridge 4 is still possible, in which sealing element 47 moves into sealing engagement with drain opening 27. When housing cover 2' has reached its final screw-in position relative to filter housing 2, and filter cartridge 4 has reached its final installation position relative to filter housing 2, as is shown in FIG. 23, sealing element 47 seals drain opening 27 in liquid-tight fashion. Filter cartridge 4 is now locked to valve bearer 30 with all upper-side locking arms 49, and filter 1 is ready for operation.

As long as filter material body of filter cartridge 4 is sufficiently permeable for the liquid to be filtered, and does not cause an excessively large pressure drop during filter operation, filter bypass valve 3 remains in its closed position, as is shown in FIG. 23.

Figure 26:
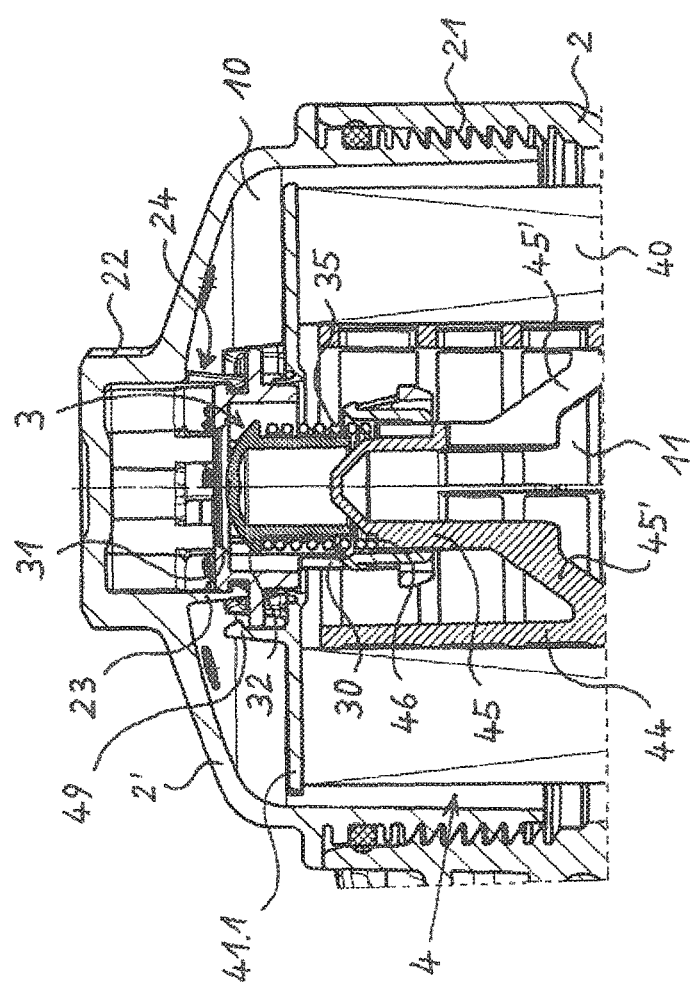
FIG. 26 shows the housing cover and an upper part of the filter housing of the filter of FIG. 1 in the state in which they are connected to one another, and with open filter bypass valve, in longitudinal section.

If the pressure drop over filter cartridge 4 exceeds a specifiable boundary value, for example due to clogging of filter material body 40 by dirt particles deposited therein from the liquid to be filtered, or due to a high viscosity of the liquid to be filtered, at raw side 10 the liquid to be filtered presses on valve body 32 with a force such that this body is moved away from its valve seat 31, against the force of spring 35, thereby releasing an immediate flow connection from raw side 10, via flow openings 24 between holding elements 23, and through the opened filter bypass valve 3, to clean side 11, bypassing filter cartridge 4. This state of filter 1, with open filter bypass valve 3, is shown in FIG. 26, which shows an upper part of filter 1. When the pressure drop decreases below the boundary value, filter bypass valve 3 again closes under the action of spring 35.

Figure 27:
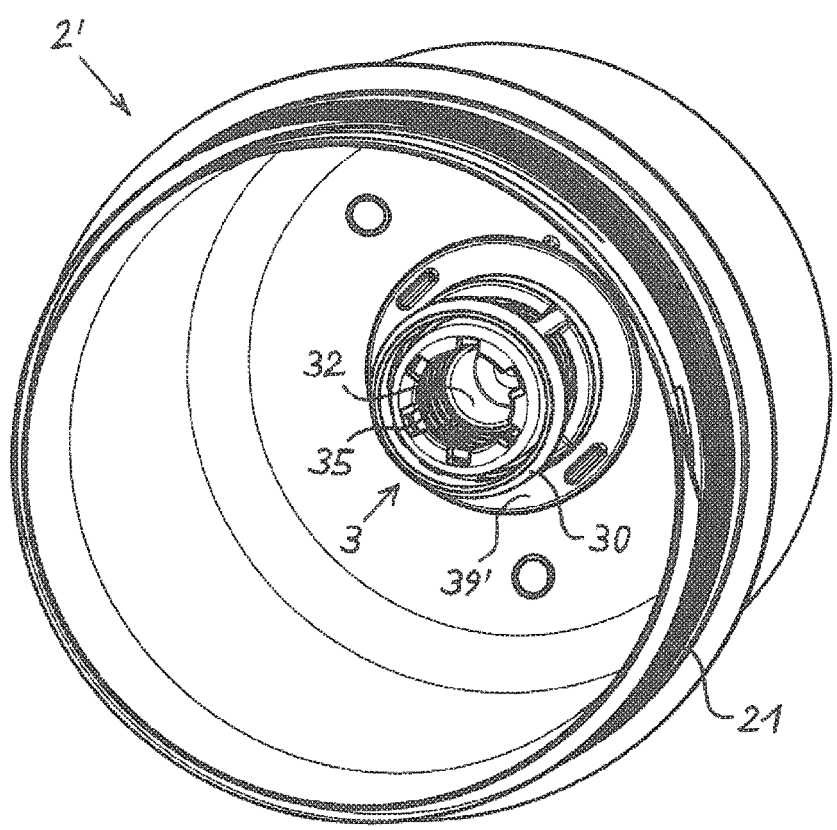
FIG. 27 shows the housing cover of FIGS. 23 through 26 in an oblique view from below.

FIG. 27 shows housing cover 2' of FIGS. 23 through 26 in an oblique view from below, so that the view of the observer falls into the interior of housing cover 2'. The cover-side part of screw threading 21 is situated on the outer circumference of the end of housing cover 2' facing the observer. Situated centrally in the interior of housing cover 2' is filter bypass valve 3 appertaining thereto, with valve bearer 30 and valve body 32 guided therein, as well as spring 35. Locking collar 39' protrudes radially outward from valve bearer 30.

Figure 28:
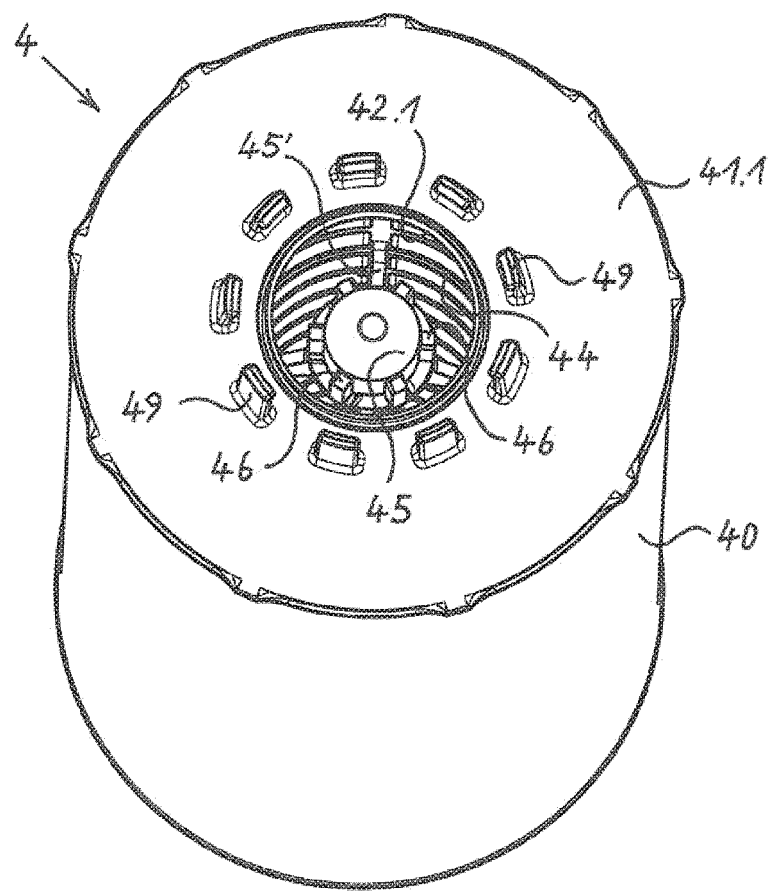
FIG. 28 shows the filter cartridge of the filter of FIG. 23, in an oblique view from above.

FIG. 28 shows filter cartridge 4 of filter 1 from FIG. 23, in an oblique view from above, i.e., onto upper end plate 41.1. Filter material body 40 is situated between upper end plate 41.1 and the lower end plate (not visible here).

In the center of upper end plate 41.1 there is situated central opening 42.1, through which a part of supporting body 44, and spring support 45, are visible. Spring support 45 is connected to support body 44 via spokes 45'. Support surface 46 for the lower end of spring 35 (not shown in FIG. 28) of filter bypass valve 3 is situated on the upper side of spring support 45.

Figure 29:
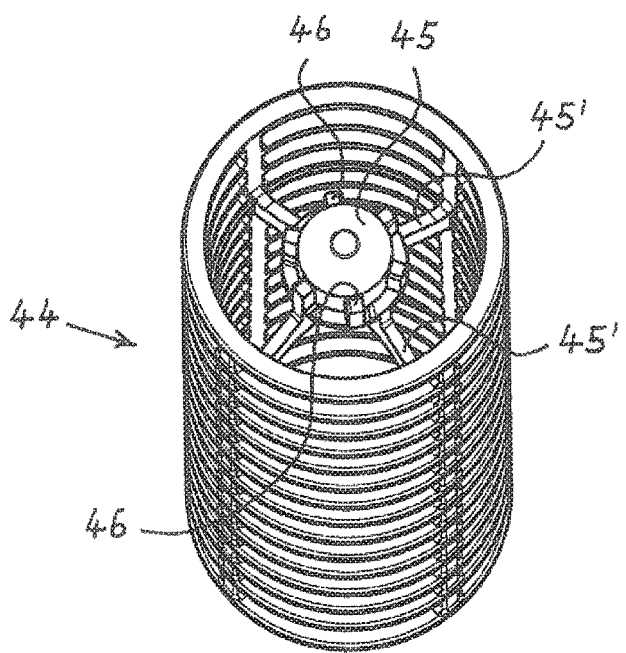
FIG. 29 shows a support body of the filter cartridge of FIG. 28 as an individual part, in an oblique view from above.

FIG. 29 shows support body 44 of filter cartridge 4 of FIG. 28 as an individual part, in an oblique view from above. Support body 44 is made up of struts running in the circumferential direction and in the axial direction, and in this way forms a hollow cylindrical grid.

From the axial struts of support body 44, spokes 45' extend radially inward and obliquely upward, which spokes bear spring support 45, situated centrally in support body 44, with its support surface 46 for spring 35 of filter bypass valve 3. Due to the oblique course of spokes 45', these are particularly well-positioned to forward the axial force exerted by spring 35 of filter bypass valve 3 on spring support 45 to the rest of support body 44, and, via this, to filter housing 2, even over a long period of operation, without damage and without deformations. Thus, an opening pressure of filter bypass valve 3, once set, remains precisely maintained even over a longer operating time of filter cartridge 4 and its support body 44.

Figure 30:
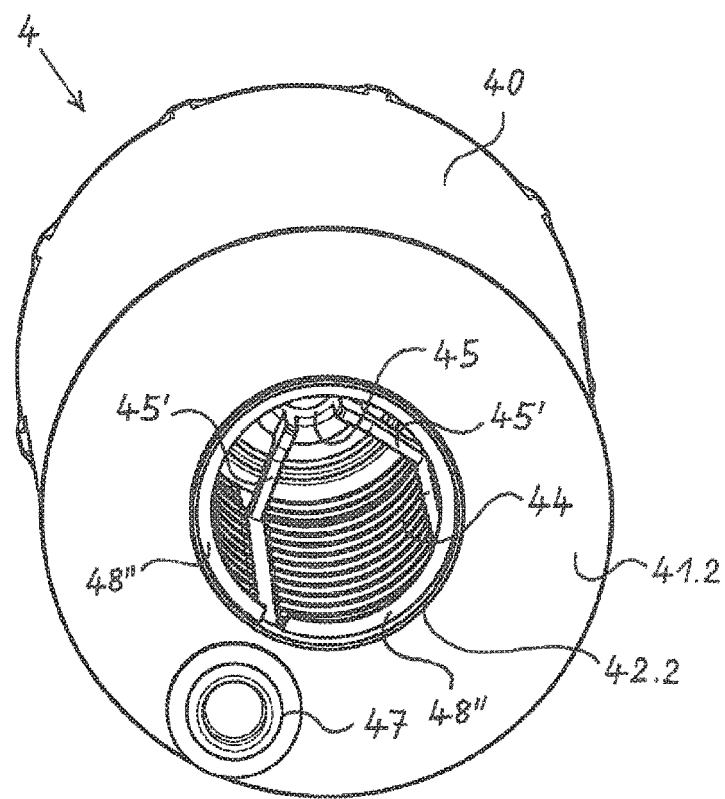
FIG. 30 shows the filter cartridge of FIG. 23 in an oblique view from below.

FIG. 30 shows filter cartridge 4 of FIG. 23 in an oblique view from below, so that now the view of the observer falls onto the underside of lower end plate 41.2. Filter material body 40 is situated on the side of end plate 41.2 facing away from the observer.

In the center of end plate 41.2 there is situated its central opening 42.2, through which a part of supporting body 44, and spring support 45 connected thereto via spokes 45', are visible. A lower region, adjacent to lower end plate 41.2, of support body 44 is fashioned as circumferential ramp 48", which, in interaction with the above-mentioned tab 28" on pipe socket-shaped outlet 26, provides a compulsory guiding of sealing element 47 on lower end plate 41.2 into a rotational position that is positionally correct for sealing drain opening 27.

Figure 31:
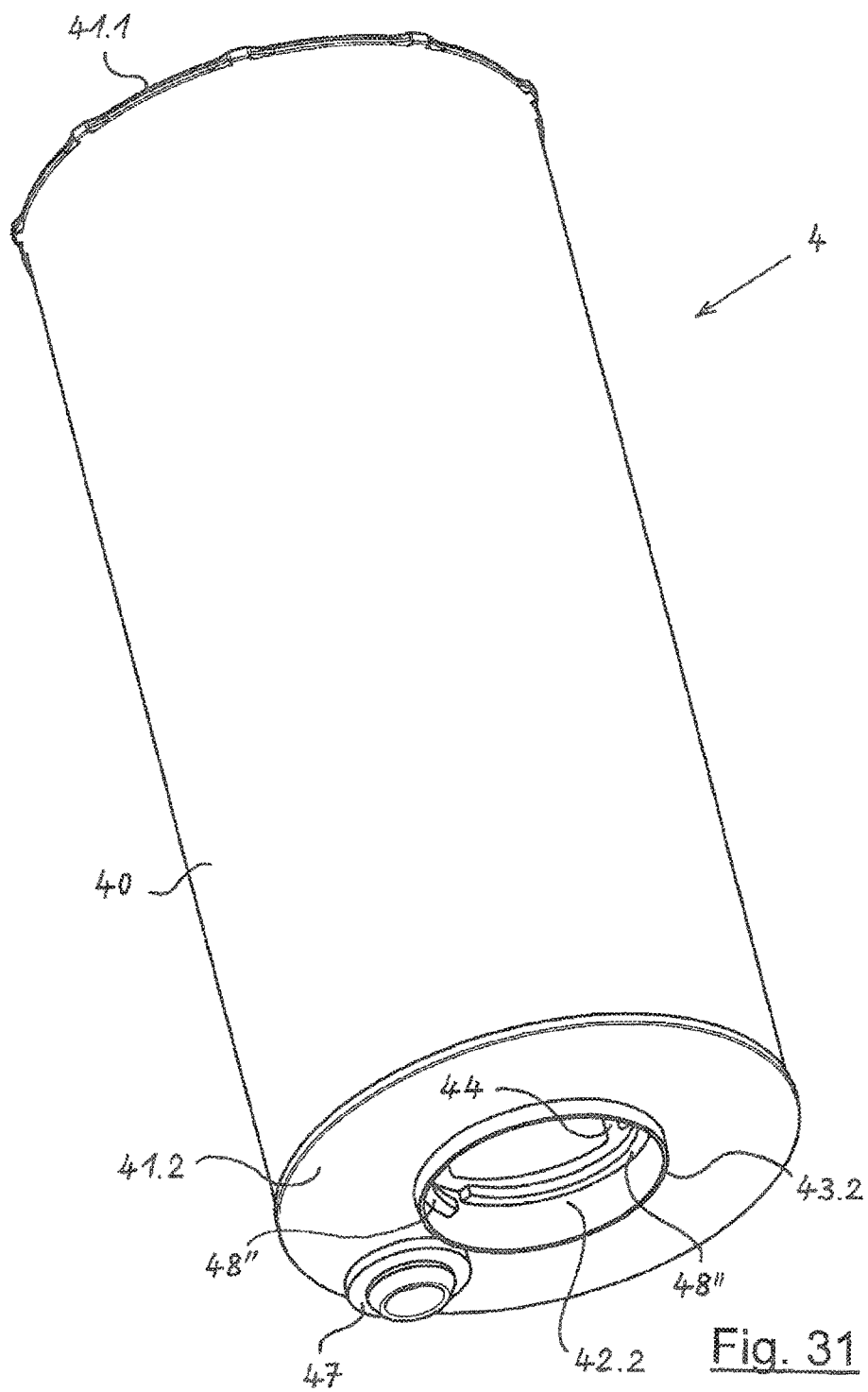
FIG. 31 shows the filter cartridge of FIG. 23 in a side view.

FIG. 31 shows filter cartridge 4 of FIG. 23 in a side view. Hollow cylindrical filter material body 40, which is made up for example of a filter material web folded in zig-zag fashion into a star shape, is encompassed at its end faces by upper end plate 41.1 and lower end plate 41.2, for example by being welded or glued together. In lower end plate 41.2, its central opening 42.2, with radial seal 43.2 surrounding it, is again visible. Through opening 42.2, a small part of support body 44, with circumferential ramp 48" forming its lower end, is visible. Sealing element 47 for sealing drain opening 27 of filter 1 is situated eccentrically on lower end plate 41.2.

Figure 32:
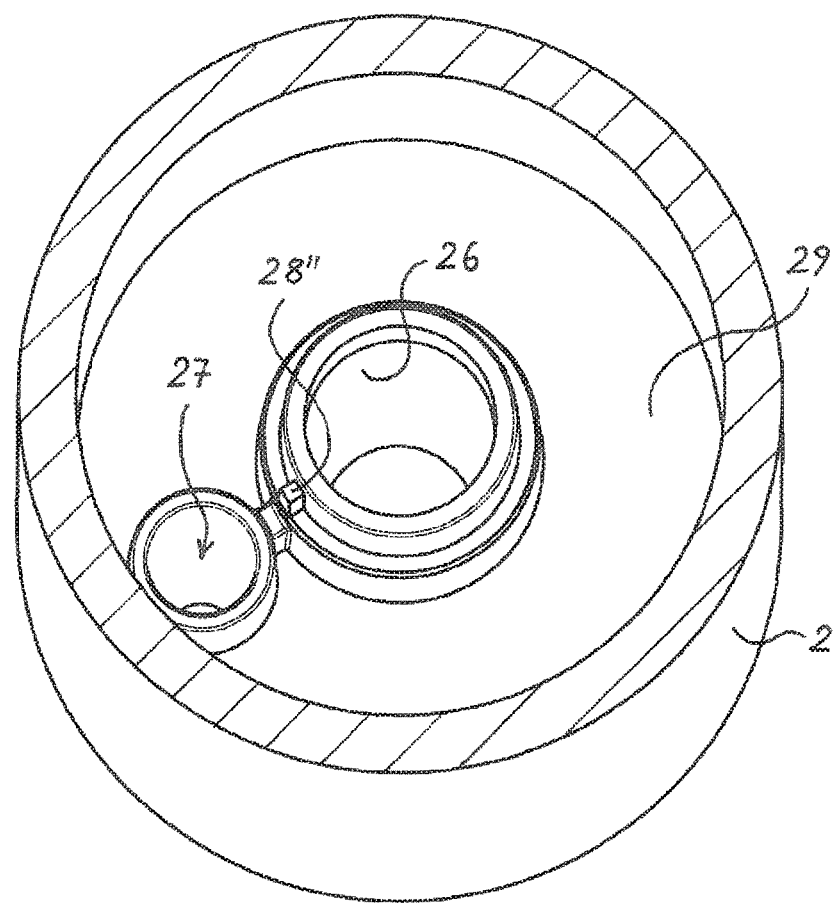
FIG. 32 shows a lower part of the filter housing in a sectioned view, obliquely from above.

FIG. 32 shows a lower part of filter housing 2 in a sectioned view, obliquely from above; here the view of the observer falls onto housing floor 29 of filter housing 2.

In the center of housing floor 29 there is situated pipe socket-shaped outlet 26 through which filtered liquid flows out during operation of the filter. On the outer circumference of outlet 26, tab 28" is integrally formed, which, in interaction with above-mentioned ramp 48" on the lower end of support body 44, provides the positioning ready for engagement of sealing element 47 of filter cartridge 4 relative to drain opening 27 situated eccentrically in housing floor 29.

Figure 33:
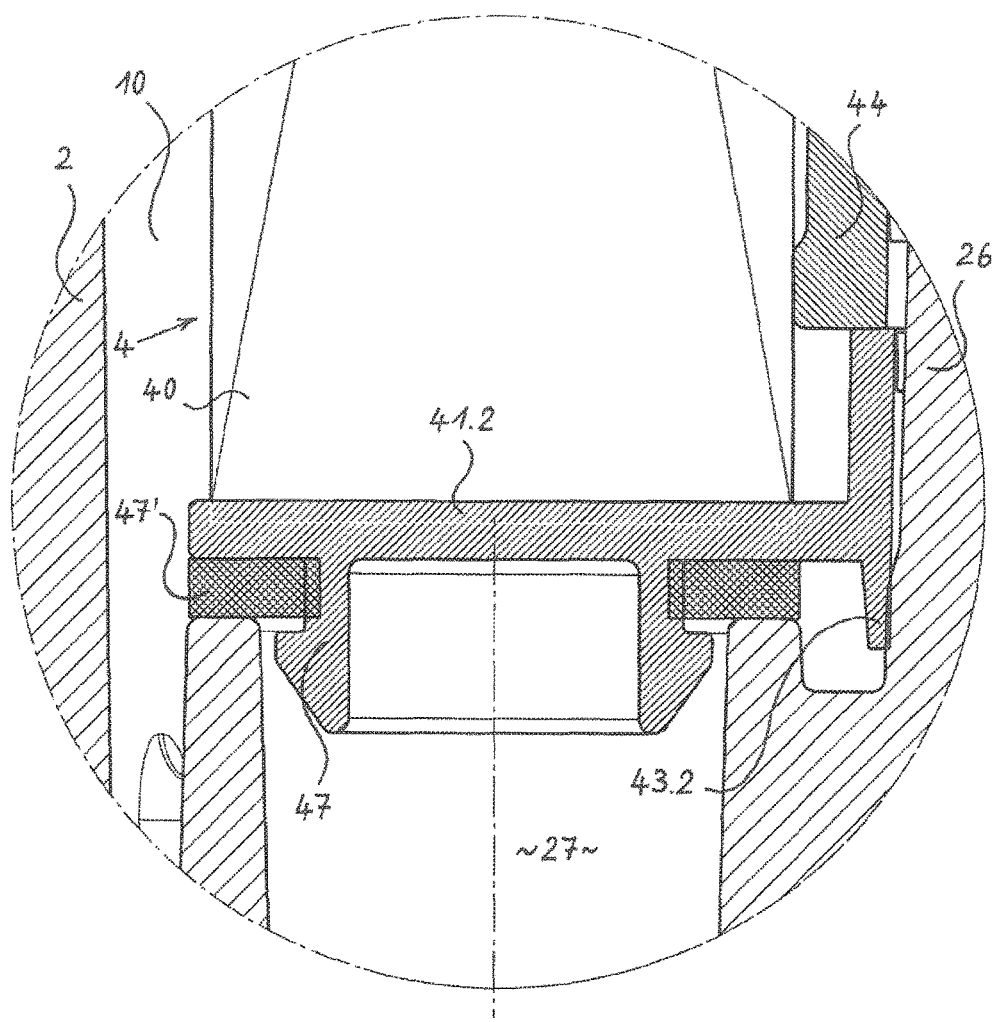
FIG. 33 shows the detail circled in FIG. 23 of the filter, in an enlarged representation.

FIG. 33 shows the detail of Filter 1 circled in FIG. 23, in an enlarged representation, and illustrates how, in the operational state of filter 1, sealing element 47 on the lower side of lower end plate 41.2 seals drain opening 27 in liquid-tight fashion. Here, sealing element 47 extends into drain opening 27, and, with an elastic sealing ring 47' that forms a part of sealing element 47, lies in sealing fashion on an upper edge of drain opening 27.

If, for the purpose of exchanging filter cartridge 4, housing cover 2' is screwed off from filter housing 2, filter cartridge 4 is carried along upward via valve bearer 30 of filter bypass valve 3, thereby opening drain opening 27 for draining filter housing 2, and filter housing 2 is drained of the liquid already before housing cover 2' has been completely detached from filter housing 2, and before filter cartridge 4 has been removed from filter housing 2.

Figure 34:
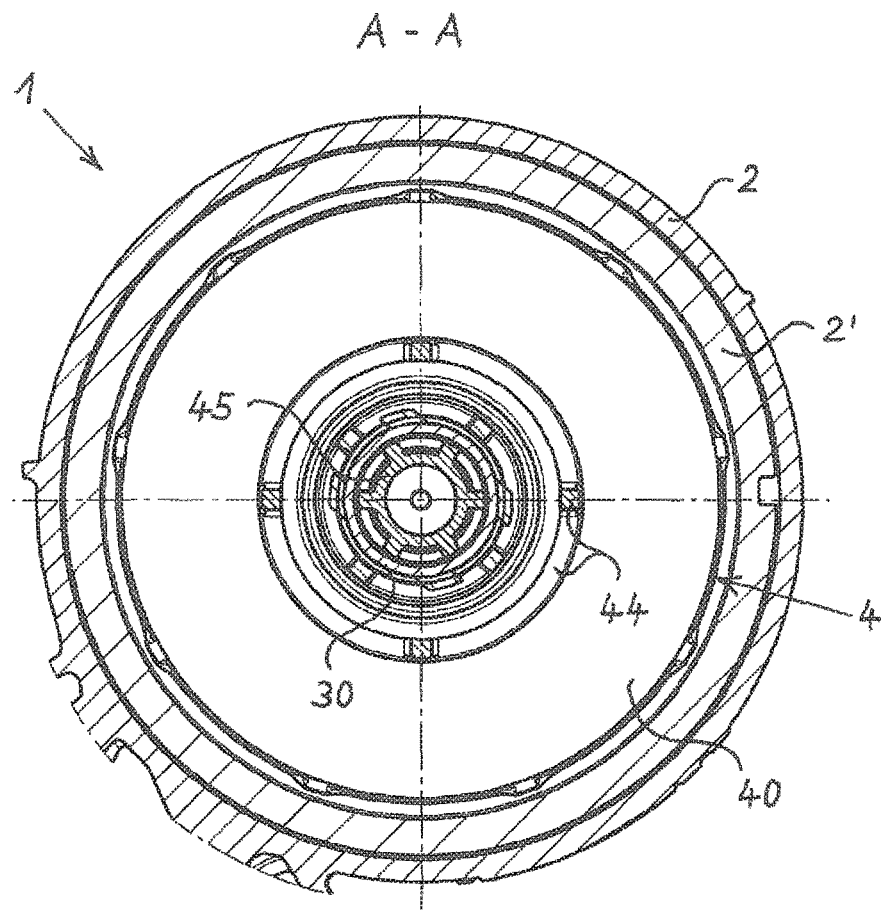
FIG. 34 shows the filter in a cross-section according to the sectional line A-A in FIG. 23.

Finally, FIG. 34 shows filter 1 in a cross-section along the sectional line A-A in FIG. 23. Filter housing 2 is sectioned radially outwardly, and connected thereto radially inwardly is housing cover 2' screwed together with filter housing 2. Further radially inwardly there then follows filter cartridge 4 with sectioned, hollow cylindrical filter material body 40, on whose inner circumference support body 44 lies in supporting fashion. Radially inward from support body 44 there is situated valve body 30 into which spring support 45 protrudes.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 filter
10 raw side
11 clean side
2 filter housing
2' housing cover
20 interior of 2, 2'
21 screw threading
22 tool attachment
23 holding elements for 3
23' welded connection
24 flow opening(s)
25 longitudinal mid-axis
26 pipe socket-shaped outlet
26' inlet
27 drain opening
28 ramp on 26
28' groove in 26
28" tab on 26
29 housing floor
3 filter bypass valve
30 valve bearer
31 valve seat
32 valve body
33 head of 32
33' shaft of 32
34 sealing surface external on 30
35 spring
36 holding collar on 30
36' locking elements on 30
37 longitudinal slots in 30

38 spring end cap
38' locking arms
39 spring intermediate support
39' locking collar on 30 for 49
4 filter cartridge
40 filter material body
41.1 upper end plate
41.2 lower end plate
42.1 central opening in 41.1
42.2 central opening in 41.2
43.1 radial seal on 41.1
43.2 radial seal on 41.2
44 support body in 4
45 spring support on 44
45' spokes
46 support surface
47 sealing element on 41.2
47' sealing ring
48 tab on 41.2
48" ramp on 41.2
49 locking arms on 41.1

The invention claimed is:

1. A filter comprising:
a filter housing having,
a housing cover that seals the filter housing during operation and is removable from the filter housing,
an inlet for liquid that is to be filtered and
an outlet for filtered liquid,
an exchangeable filter cartridge that separates a raw side and a clean side of the filter from one another, and
a filter bypass valve that is made up of a valve seat and a valve body that is guided so as to be movable relative to the valve seat and is pre-loaded with a force acting in the valve closing direction,
the valve seat being situated in or on the housing cover, fixed to the cover,
the valve body being guided in or on the housing cover, fixed to the cover, and
a spring that pre-loads the valve body in the valve closing direction being guided in or on the housing cover, fixed to the cover,
the filter cartridge having a spring support, and
wherein, in the state in which the filter cartridge is installed in the filter, and when the housing cover is attached on the filter housing, the spring is supported and pre-tensioned at its end oriented away from the valve body by the spring support.

2. The filter as recited in claim 1, wherein the filter bypass valve has a valve bearer, and wherein the valve body and the spring are guided in the valve bearer.

3. The filter as recited in claim 2, wherein the valve seat is fashioned on or in the valve bearer.

4. The filter as recited in claim 2, wherein the valve bearer is produced as a separate part and is connected to the rest of the housing cover.

5. The filter as recited in claim 4, wherein the valve bearer is one of locked, welded, glued or screwed to the rest of the housing cover.

6. The filter as recited in claim 4, wherein the valve bearer is connected to the housing cover at its outer circumference, leaving open at least one flow opening that leads from the raw side to the valve seat, and that the valve seat is fashioned as a perforation in the valve bearer, concentric to a longitudinal mid-axis of the housing cover.

7. The filter as recited in claim 2, wherein the valve bearer is realized in one piece with the rest of the housing cover.

8. The filter as recited in claim 7, wherein the valve bearer is provided with at least one flow opening that leads from the raw side to the valve seat, and wherein the valve seat is fashioned as a perforation in the valve bearer that is concentric to a longitudinal mid-axis of the housing cover.

9. The filter as recited in claim 1, wherein the spring is a helical pressure spring and surrounds the valve body at least over a part of its length.

10. The filter as recited in claim 1, wherein the filter cartridge is capable of being produced indifferent embodiments, the filter cartridge having a single support that is capable of being produced in different specific embodiments, the different embodiments of the filter cartridge differing by different axial lengths of its spring support or by different axial positions of its spring support, and the pre-tension of the spring and the opening pressure of the filter bypass valve being capable of being modified thereby.

11. The filter as recited in claim 2, wherein a spring end cap or spring intermediate support, which covers the end of the spring oriented away from the valve body and is capable of limited axial displacement relative to the valve bearer, is guided in or on the valve bearer.

12. The filter as recited in claim 11, wherein the filter is capable of being produced in different embodiments, the different embodiments of the filter differing by different axial lengths of the spring end cap or spring intermediate support, and the pre-tension of the spring and the opening pressure of the filter bypass valve being capable of being modified thereby.

13. The filter as recited in claim 2, wherein the valve bearer has on its outer circumference a sealing surface for a radial sealing ring situated on the cover side on the filter cartridge.

14. The filter as recited in claim 1, wherein the spring support present on the filter cartridge is connected to, or made in one piece with, a central support body or an end plate of the filter cartridge.

15. The filter as recited in claim 1, wherein the filter housing has an eccentric drain opening on a housing floor remote from the cover, the filter cartridge has a sealing element on its side oriented toward the housing floor in the installed state, and, in the state in which the filter cartridge is installed in the filter, and when the housing cover is attached on the filter housing, the spring charges the filter cartridge, via the spring support, with a force that holds the sealing element in a sealing seating on the drain opening.

16. The filter as recited in claim 15, wherein the filter cartridge has, on its side facing the housing floor in the installed state, a lower end plate having a central opening by which the filter cartridge can be plugged onto the centrally situated outlet fashioned in the shape of a pipe socket, and that the lower end plate is filled with a sealing material ring as sealing element on its side oriented toward the housing floor, over a region that covers the drain opening in every position in the circumferential direction.

17. The filter as recited in claim 15, wherein the filter cartridge has, on its side oriented toward the housing floor in the installed state, a lower end plate having a central opening by which the filter cartridge can be plugged onto the centrally situated outlet fashioned in the shape of a pipe socket, and that the lower end plate bears, on its side oriented toward the housing floor, a sealing material disk or a sealing material ring as sealing element, whose diameter is matched to the drain opening, and wherein positioning guide means are situated on the filter cartridge and on the pipe socket-shaped outlet, by which means the filter cartridge can be compulsorily guided, during its installation in the filter, into a rotational position in which the sealing element covers the drain opening.

18. The filter as recited in claim 17, wherein the interacting positioning guide means are formed by at least one ramp that runs with a helical shape and an axial groove connected thereto on the outer circumference of the pipe socket-shaped outlet, and a radially inward-protruding tab in the central opening in the lower end plate of the filter cartridge, or wherein the interacting positioning guide means on the filter cartridge are formed by a ramp that runs with a helical shape with a step therein and by a radially outward-protruding tab on the outer circumference of the pipe socket-shaped outlet.

19. A filter cartridge that interacts with a filter as recited in claim 1, wherein the filter cartridge has a spring support, and wherein, in the state in which the filter cartridge is installed in the filter, the spring of the filter bypass valve is configured to be supported and pre-tensioned at its end oriented away from the valve body by the spring support of the filter cartridge.

20. The filter cartridge as recited in claim 19, wherein the spring support is formed by a support body that forms a part of the filter cartridge, or is fashioned on a support body that forms a cart of the filter cartridge.

21. The filter cartridge as recited in claim 19, wherein the spring support is formed by an end plate of the filter cartridge, or is fashioned on an end plate of the filter cartridge.

22. The filter cartridge as recited in claim 19, wherein the cartridge is capable of being produced in different embodiments, the filter cartridge having a single spring support that is capable of being produced in different specific embodiments, the different embodiments of the filter cartridge differing by different axial lengths of its spring support or by different axial positions of its spring support, and the pre-tension of the spring and the opening pressure of the filter bypass valve being capable of being modified thereby.

23. The filter cartridge as recited in claim 19, wherein the spring support has a support surface that is shaped and situated corresponding to the shape and situation of the end of the spring, or of the spring end cap, or of the spring intermediate support, oriented toward the spring support.

24. The filter cartridge as recited in claim 19, wherein the cartridge has a sealing element on its side oriented towards a housing floor in the installed state, and wherein, in the state in which the filter cartridge is installed, and when the housing cover (s attached on the filter housing, the filter cartridge can be charged, by the spring of the filter bypass valve, via the spring support, with a force that holds the sealing element in a sealing seating on an eccentric drain opening situated in the housing floor.

25. The filter cartridge as recited in claim 24, wherein the cartridge has a lower end plate having a central opening on its side that in the installed state is oriented toward the housing floor, by which opening the filter cartridge can be plugged onto a centrally situated outlet of the filter, fashioned in the shape of a pipe socket, and that the lower end plate is filled, on its side oriented toward the housing floor in the installed state, with a sealing material ring as sealing element, over a region that covers the drain opening in each position in the circumferential direction.

26. The filter cartridge as recited in claim 24, wherein the cartridge has, on its side oriented toward the housing floor in the installed state, a lower end plate having a central opening by which the filter cartridge can be plugged onto a centrally situated outlet, fashioned in the shape of a pipe socket, of the filter, and that the lower end plate bears, on its side oriented toward the housing floor in the installed state, a sealing material disk or a sealing material ring as sealing element, whose diameter is matched to the drain opening, and that positioning guide means are situated on the filter cartridge by which the filter cartridge, during its installation in the filter, is capable of being compulsorily guided, in interaction with further positioning guide means situated on the pipe socket-shaped outlet, into a rotational position in which the sealing element coincides with the drain opening.

27. The filter cartridge as recited in claim 26, wherein the positioning guide means on the filter cartridge are formed by a radially inward-protruding tab in the central opening in the lower end plate, the tab interacting, during installation of the filter cartridge in the filter, in positioning fashion with at least one ramp that runs in a helical shape and with an axial groove connected thereto on the outer circumference of the pipe socket-shaped outlet or that the positioning guide means on the filter cartridge are formed by a ramp running with a helical shape having a step therein, the ramp interacting, during installation of the filter cartridge in the filter, in positioning fashion with a radially outward-protruding tab on the outer circumference of the pipe socket-shaped outlet.

\* \* \* \* \*